US012462735B2

(12) United States Patent
Yu et al.

(10) Patent No.: US 12,462,735 B2
(45) Date of Patent: Nov. 4, 2025

(54) DISPLAY DEVICE

(71) Applicants: Samsung Display Co., LTD., Yongin-si (KR); IUCF-HYU (Industry-University Cooperation Foundation Hanyang University), Seoul (KR)

(72) Inventors: Byungchang Yu, Yongin-si (KR); Kyunghoon Chung, Yongin-si (KR); Oh-Kyong Kwon, Seoul (KR); Youn-Sik Kim, Seoul (KR); Sung-Min Wee, Seoul (KR)

(73) Assignees: SAMSUNG DISPLAY CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/634,919

(22) Filed: Apr. 13, 2024

(65) Prior Publication Data

US 2025/0006111 A1 Jan. 2, 2025

(30) Foreign Application Priority Data

Jun. 27, 2023 (KR) ........................ 10-2023-0082430

(51) Int. Cl.
*G09G 3/32* (2016.01)

(52) U.S. Cl.
CPC ....... *G09G 3/32* (2013.01); *G09G 2310/0267* (2013.01); *G09G 2320/0247* (2013.01); *G09G 2330/021* (2013.01)

(58) Field of Classification Search
CPC ... G09G 3/32–3291; G09G 2300/0421; G09G 2300/043; G09G 2300/0809–0819;
(Continued)

(56) References Cited

U.S. PATENT DOCUMENTS 8,957,837 B2 2/2015 Han
9,460,662 B2 10/2016 Lee et al.
(Continued)

FOREIGN PATENT DOCUMENTS

KR 101162864 B1 7/2012
KR 102185361 B1 12/2020
(Continued)

OTHER PUBLICATIONS

Chih-Lung Lin et al., "Pixel Circuit With Leakage Prevention Scheme for Low-Frame-Rate AMOLED Displays," in IEEE Journal of the Electron Devices Society, vol. 8, pp. 235-240, 2020.
(Continued)

*Primary Examiner* — Nathan Danielsen
(74) *Attorney, Agent, or Firm* — CANTOR COLBURN LLP

(57) ABSTRACT

A display device includes a display panel including a pixel. The pixel includes: a light emitting element; a first capacitor between a first node and a voltage line; a first transistor connected to the first node, the voltage line, and a second node; a second transistor connected between the first node and a third node and for receiving a first scan signal; a third transistor connected between the second node and the third node and for receiving a second scan signal; a second capacitor connected between the third node and a fourth node; a fourth transistor connected between the fourth node and a data line and for receiving a third scan signal; and a fifth transistor connected between the second node and the light emitting element and for receiving a first emission control signal.

24 Claims, 20 Drawing Sheets

(58) Field of Classification Search
CPC ... G09G 2300/0842; G09G 2300/0852; G09G 2300/0861; G09G 2310/0243; G09G 2310/0248; G09G 2310/0251; G09G 2310/0267; G09G 2310/06–063; G09G 2310/08; G09G 2320/0233; G09G 2320/0242–0252; G09G 2330/021
See application file for complete search history.

(56) References Cited

U.S. PATENT DOCUMENTS

| | | | | |
|---|---|---|---|---|
| 9,823,729 | B2 | 11/2017 | An et al. | |
| 11,211,012 | B2 | 12/2021 | Hao et al. | |
| 11,386,844 | B2 | 7/2022 | Jeon et al. | |
| 2020/0135106 | A1* | 4/2020 | Lu | G09G 3/3258 |
| 2021/0343242 | A1* | 11/2021 | Wang | G09G 3/3258 |
| 2022/0084472 | A1* | 3/2022 | Kim | G09G 3/3266 |
| 2023/0013346 | A1 | 1/2023 | Kim et al. | |
| 2023/0206844 | A1* | 6/2023 | Kim | G09G 3/3266 345/204 |
| 2023/0351956 | A1* | 11/2023 | Liu | G09G 3/3241 |

FOREIGN PATENT DOCUMENTS

| | | | |
|---|---|---|---|
| KR | 1020210019635 | A | 2/2021 |
| KR | 102288351 | B1 | 8/2021 |
| KR | 1020230011547 | A | 1/2023 |

OTHER PUBLICATIONS

Nack-Hyeon Keum et al., "An AMOLED Pixel Circuit With a Compensating Scheme for Variations in Subthreshold Slope and Threshold Voltage of Driving TFTs," in IEEE Journal of Solid-State Circuits, vol. 55, pp. 3087-3096, 2020.

S.-M. Choi et al., "A Self-compensated Voltage Programming Pixel Structure for Active-Matrix Organic Light Emitting Diodes," IDW Tech. Digest, 535-538 (2003).

* cited by examiner

DISPLAY DEVICE

This application claims priority to Korean Patent Application No. 10-2023-0082430, filed on Jun. 27, 2023, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device having uniform light emitting characteristics.

A light emitting display device among display devices displays an image by using a light emitting diode that generates light through the recombination of electrons and holes. The light emitting display device is driven with a low power while providing a fast response speed.

The light emitting display device includes pixels connected with data lines and a scan line. Each of the pixels generally includes a light emitting diode, and a circuit unit for controlling the amount of current flowing to the light emitting diode. In response to a data signal, the circuit unit may control the amount of current that flows from a terminal, to which a first driving voltage is applied, to a terminal, to which a second driving voltage is applied, via the light emitting diode. In this case, light of predetermined luminance is generated to correspond to the amount of current flowing through the light emitting diode.

SUMMARY

Embodiments of the present disclosure provide a display device having improved display quality by employing pixels having uniform light emitting characteristics even when an operating frequency is varied.

According to an embodiment, a display device includes a display panel including a pixel. The pixel includes: a light emitting element; a first capacitor connected between a first node and a voltage line; a first transistor connected to the first node, the voltage line, and a second node; a second transistor connected between the first node and a third node and for receiving a first scan signal; a third transistor connected between the second node and the third node and for receiving a second scan signal; a second capacitor connected between the third node and a fourth node; a fourth transistor connected between the fourth node and a data line and for receiving a third scan signal; and a fifth transistor connected between the second node and the light emitting element and for receiving a first emission control signal.

According to an embodiment, a display device includes a display panel including a pixel. The pixel includes: a light emitting element; a first capacitor connected between a first node and a voltage line; a first transistor connected to the first node, the voltage line, and a second node; a second transistor connected between the first node and a third node and for receiving a first scan signal; a third transistor connected between the second node and the third node and for receiving a second scan signal; a second capacitor connected between the third node and a fourth node; a fourth transistor connected between the fourth node and a data line and for receiving a third scan signal; and a shift compensation transistor connected between the second node and a reference voltage line and for receiving a shift scan signal.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
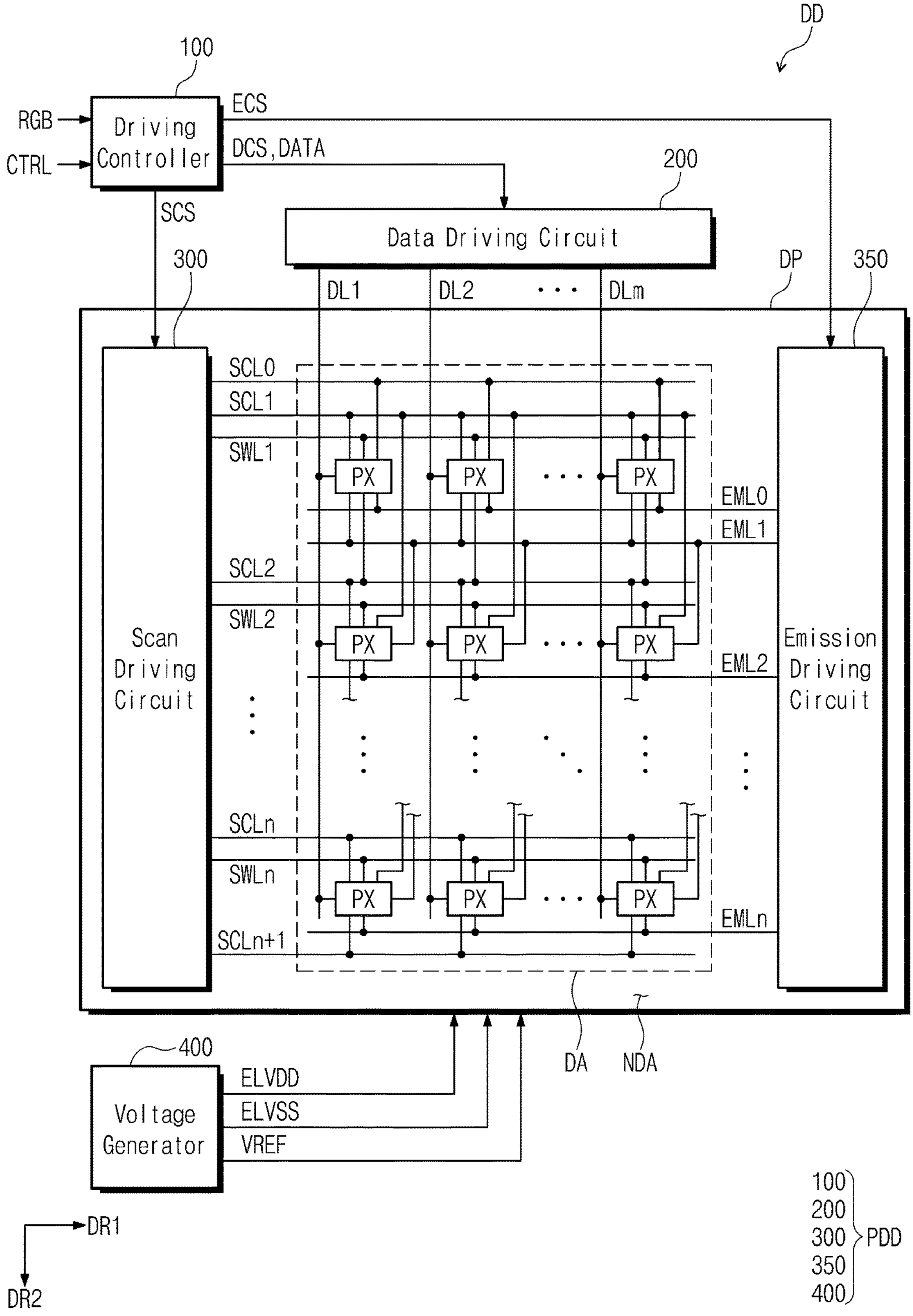
FIG. 1 is a block diagram of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device, according to an embodiment of the present disclosure.

Referring to FIG. 1, a display device DD may be a device that is activated depending on an electrical signal to display an image. The display device DD may be applied to an electronic device such as a smart watch, a tablet PC, a notebook, a computer, or a smart television.

The display device DD includes a display panel DP and a panel driver PDD that drives the display panel DP. As an example of the present disclosure, a panel driver PDD may include a driving controller 100, a data driving circuit 200, a scan driving circuit 300, an emission driving circuit 350, and a voltage generator 400.

The driving controller 100 receives an image signal RGB and a control signal CTRL. The driving controller 100 generates image data DATA by converting a data format of the image signal RGB so as to be suitable for the interface specification of the data driving circuit 200. The driving controller 100 outputs a scan control signal SCS, a data control signal DCS, and an emission driving signal ECS.

The data driving circuit 200 receives the data control signal DCS and the image data DATA from the driving controller 100. The data driving circuit 200 converts the image data DATA into data signals and outputs the data signals to a plurality of data lines DL1 to DLm to be described later. The data signals refer to analog voltages corresponding to grayscale values of the image data DATA.

The voltage generator 400 generates voltages to operate the display panel DP. In an embodiment of the present disclosure, the voltage generator 400 generates a first driving voltage ELVDD, a second driving voltage ELVSS, and a reference voltage VREF. The reference voltage VREF may have a lower voltage level than the first driving voltage ELVDD.

The display panel DP includes scan lines SCL0 to SCLn+1 and SWL1 to SWLn, emission control lines EML0 to EMLn, data lines DL1 to DLm, and pixels PX. A display area DA and a non-display area NDA are defined in the display panel DP. The scan lines SCL0 to SCLn+1 and SWL1 to SWLn, the emission control lines EML0 to EMLn, the data lines DL1 to DLm, and the pixels PX may be disposed in the display area DA. The scan lines SCL0 to SCLn+1 and SWL1 to SWLn extend in a first direction DR1 and are arranged spaced from each other in a second direction DR2. The emission control lines EML0 to EMLn extend in the first direction DR1 and are arranged spaced from each other in the second direction DR2. The data lines DL1 to DLm extend in the second direction DR2 and are arranged spaced from each other in the first direction DR1.

As an example of the present disclosure, the scan lines SCL0 to SCLn+1 and SWL1 to SWLn may include compensation scan lines SCL0 to SCLn+1 and write scan lines SWL1 to SWLn. However, the present disclosure is not limited thereto, and the display panel DP may further include other scan lines in another embodiment.

The scan driving circuit 300 and the emission driving circuit 350 may be disposed in the non-display area NDA of the display panel DP. As an example of the present disclosure, the scan driving circuit 300 is positioned adjacent to one side of the display area DA, and the emission driving circuit 350 is positioned adjacent to the other side of the display area DA opposite to the one side. In the example shown in FIG. 1, the scan driving circuit 300 and the emission driving circuit 350 are positioned on opposite sides of the display area DA, respectively, but the present disclosure is not limited thereto. For another example, each of the scan driving circuit 300 and the emission driving circuit 350 may be positioned adjacent to one of one side and the other side of the display panel DP. In an embodiment, the scan driving circuit 300 and the emission driving circuit 350 may be integrated into one circuit.

The plurality of pixels PX may be positioned in the display area DA of the display panel DP. The plurality of pixels PX are electrically connected to the compensation scan lines SCL0 to SCLn+1, the write scan lines SWL1 to SWLn+1, the emission control lines EML0 to EMLn, and the data lines DL1 to DLm. Each of the plurality of pixels PX may be electrically connected to at least one compensation scan line, at least one write scan line, and at least one emission control line. In an embodiment, for example, as shown in FIG. 1, the first row of pixels may be connected to a dummy compensation scan line SCL0, a first compensation scan line SCL1, a second compensation scan line SCL2, a first write scan line SWL1, a dummy emission control line EML0, and a first emission control line EML1. Moreover, the second row of pixels may be connected to the first compensation scan line SCL1, the second compensation scan line SCL2, a third compensation scan line, a second write scan line SWL2, the first emission control line EML1, and a second emission control line EML2. However, the number of scan lines connected to each of the pixel and the number of emission control lines connected to each of the pixel are not limited thereto. For another example, the number of scan lines and the number of emission control lines may be varied.

Each of the plurality of pixels PX includes a light emitting element ED (see FIG. 2) and a pixel circuit unit PXC (see FIG. 2) for controlling the emission of the light emitting element ED. The pixel circuit unit PXC may include one or more transistors and one or more capacitors. Through the same process as transistors of the pixel circuit unit PXC, the scan driving circuit 300 and the emission driving circuit 350 may be disposed directly in the non-display area NDA of the display panel DP.

Each of the plurality of pixels PX receives the first driving voltage ELVDD, the second driving voltage ELVSS, and the reference voltage VREF from the voltage generator 400.

The scan driving circuit 300 receives the scan control signal SCS from the driving controller 100. The scan driving circuit 300 may output compensation scan signals and write scan signals to the compensation scan lines SCL0 to SCLn+1 and the write scan lines SWL1 to SWLn in response to the scan control signal SCS. The emission driving circuit 350 may output emission control signals to the emission control lines EML0 to EMLn in response to the emission driving signal ECS from the driving controller 100.

The driving controller 100 according to an embodiment of the present disclosure may determine an operating frequency and may control the data driving circuit 200, the scan driving circuit 300, and the emission driving circuit 350 depending on the determined operating frequency. As an example of the present disclosure, the emission driving circuit 350 may operate at a frequency higher than or equal to a frequency of the scan driving circuit 300.

Figure 2:
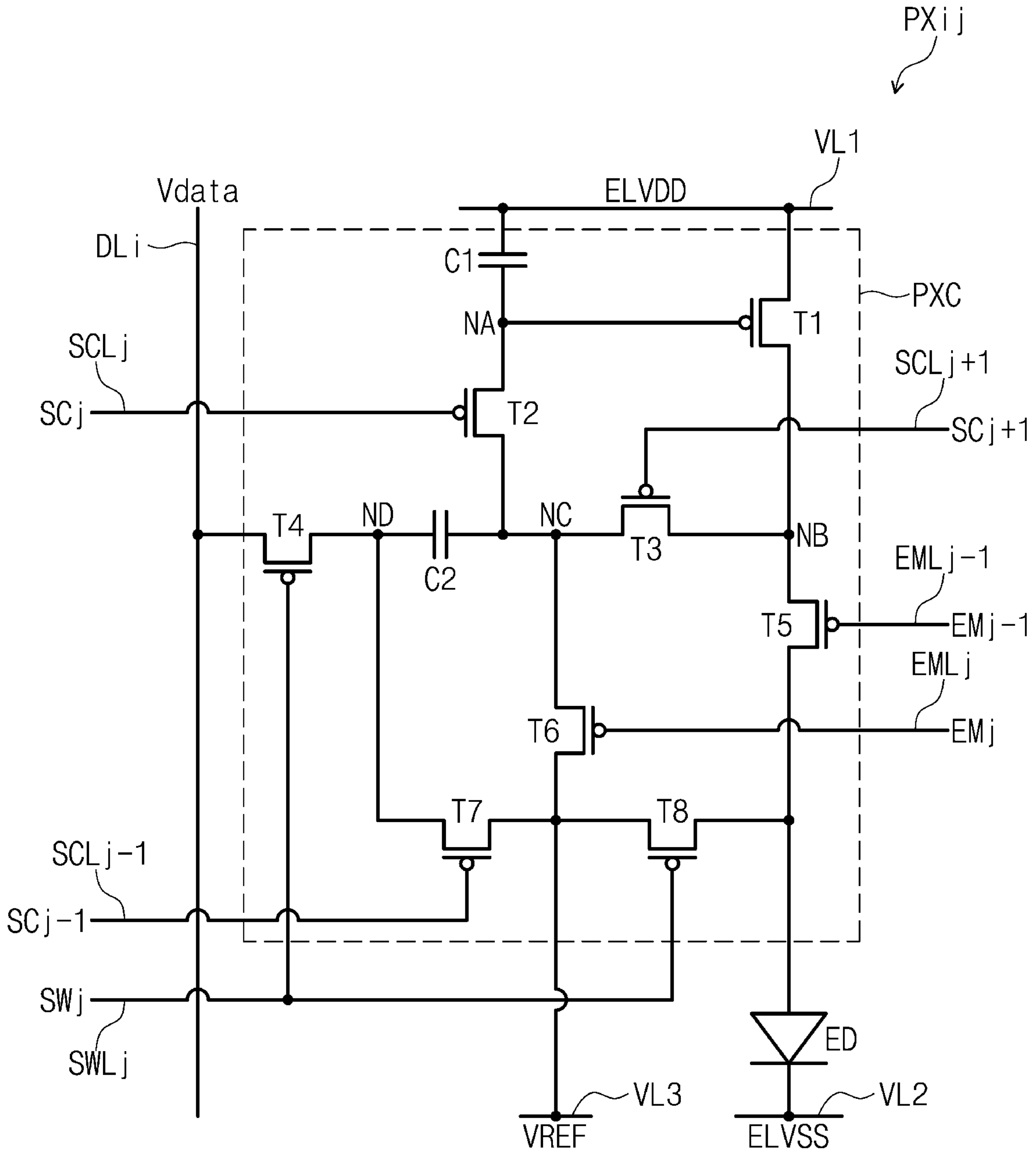
FIG. 2 is a circuit diagram of a pixel, according to an embodiment of the present disclosure.

FIG. 2 is a circuit diagram of a pixel, according to an embodiment of the present disclosure.

FIG. 2 shows an equivalent circuit diagram of a pixel PXij connected to an i-th data line DLi among the data lines DL1 to DLm, a (j−1)-th compensation scan line SCLj−1, a j-th compensation scan line SCLj, and a (j+1)-th compensation scan line SCLj+1 among the compensation scan lines SCL0 to SCLn+1, a j-th write scan line SWLj among the write scan lines SWL1 to SWLn, and a (j−1)-th emission control line EMLj−1 and a j-th emission control line EMLj among the emission control lines EML0 to EMLn, which are shown in FIG. 1. Because each of the plurality of pixels PX shown in FIG. 1 has the same circuit configuration as the circuit configuration of the pixel PXij shown in FIG. 2, detailed descriptions of the remaining pixels are omitted.

Referring to FIG. 2, the pixel PXij according to an embodiment includes the pixel circuit unit PXC and the light emitting element ED. In an embodiment of the present disclosure, the pixel circuit unit PXC may include eight transistors and two capacitors. Hereinafter, the eight transistors are referred to as "first to eighth transistors T1, T2, T3, T4, T5, T6, T7, and T8", respectively. The two capacitors are referred to as "first and second capacitors C1 and C2", respectively.

In an embodiment, each of the first to eighth transistors T1 to T8 is a P-type transistor having a low-temperature polycrystalline silicon ("LTPS") semiconductor layer. Alternatively, each of the first to eighth transistors T1 to T8 may be an N-type transistor. Moreover, at least one of the first to eighth transistors T1 to T8 may be an N-type transistor and the others thereof may be P-type transistors. Alternatively, at least one of the first to eighth transistors T1 to T8 may be a transistor having an oxide semiconductor layer. In an embodiment, for example, some of the first to eighth transistors T1 to T8 may be oxide semiconductor transistors, and others thereof may be LTPS transistors.

A circuit configuration of the pixel PXij according to an embodiment of the present disclosure is not limited to the circuit configuration shown in FIG. 2. The pixel PXij illustrated in FIG. 2 is only an example, and the circuit configuration of the pixel PXij may be modified and implemented.

The j-th compensation scan line SCLj and the j-th write scan line SWLj supply a j-th compensation scan signal SCj and a j-th write scan signal SWj to the pixel PXij, respectively. The (j−1)-th compensation scan line SCLj−1 and the (j+1)-th compensation scan line SCLj+1 supply a (j−1)-th compensation scan signal SCj−1 and a (j+1)-th compensation scan signal SCj+1 to the pixel PXij, respectively. Furthermore, the (j−1)-th emission control line EMLj−1 and the j-th emission control line EMLj supply a (j−1)-th emission control signal EMj−1 and the j-th emission control signal EMj to the pixel PXij, respectively. The i-th data line DLi delivers an i-th data voltage Vdata to the pixel PXij. The i-th data voltage Vdata may have a voltage level corresponding to the image signal RGB input to the display device DD (see FIG. 1).

The pixel PXij may be connected to a first voltage line VL1, a second voltage line VL2, and a reference voltage line VL3. The first voltage line VL1 delivers the first driving voltage ELVDD supplied from the voltage generator 400 shown in FIG. 1 to the pixel PXij. The second voltage line VL2 delivers the second driving voltage ELVSS supplied from the voltage generator 400 to the pixel PXij. The reference voltage line VL3 may deliver the reference voltage VREF supplied from the voltage generator 400 to the pixel PXij.

The first capacitor C1 is connected between a first node NA and the first voltage line VL1 for receiving the first driving voltage ELVDD.

The first transistor T1 may be connected to the first node NA, the first voltage line VL1, and a second node NB, and may operate depending on a potential difference between the first node NA and the second node NB. The first transistor T1 includes a first electrode connected to the first voltage line VL1, a second electrode connected to the second node NB, and a gate electrode connected to the first node NA. The first transistor T1 operates depending on a potential of the first node NA, and electrically connects the second node NB and the first voltage line VL1.

The second transistor T2 is connected between the first node NA and a third node NC and receives a first scan signal. The second transistor T2 includes a first electrode connected to the third node NC, a second electrode connected to the first node NA, and a gate electrode for receiving the first scan signal. As an example of the present disclosure, the second transistor T2 may be connected to the j-th compensation scan line SCLj to receive the j-th compensation scan signal SCj as the "first scan signal". The second transistor T2 is turned on in response to the first scan signal and controls the potential of the gate electrode of the first transistor T1.

The third transistor T3 is connected between the second node NB and the third node NC and receives a second scan signal. The third transistor T3 includes a first electrode connected to the second node NB, a second electrode connected to the third node NC, and a gate electrode for receiving the second scan signal. As an example of the present disclosure, the third transistor T3 is connected to the (j+1)-th compensation scan line SCLj+1 to receive the (j+1)-th compensation scan signal SCj+1 as the "second scan signal". The third transistor T3 turns on in response to the second scan signal to deliver a signal, which is output from the second electrode of the first transistor T1, to the third node NC. As an example of the present disclosure, the first scan signal may be a signal activated prior to the second scan signal.

The fourth transistor T4 is connected between a fourth node ND and the i-th data line DLi and receives a third scan signal. The fourth transistor T4 includes a first electrode connected to the i-th data line DLi, a second electrode connected to the fourth node ND, and a gate electrode for receiving the third scan signal. As an example of the present disclosure, the fourth transistor T4 is connected to the j-th write scan line SWLj to receive the j-th write scan signal SWj as the "third scan signal". The fourth transistor T4 may be turned on in response to the third scan signal to output the i-th data voltage Vdata supplied through the i-th data line DLi to the fourth node ND.

The second capacitor C2 may be connected between the third node NC and the fourth node ND.

The fifth transistor T5 is connected between the second node NB and the light emitting element ED, and receives a first emission control signal. The fifth transistor T5 includes a first electrode connected to the second node NB, a second electrode connected to the anode of the light emitting element ED, and a gate electrode for receiving the first emission control signal. The fifth transistor T5 may be connected to the (j−1)-th emission control line EMLj−1 to receive the (j−1)-th emission control signal EMj−1 as the "first emission control signal". The fifth transistor T5 electrically connects the anode of the second node NB and the light emitting element ED in response to the first emission control signal.

The sixth transistor T6 is connected between the reference voltage line VL3 supplied with the reference voltage VREF and the third node NC, and receives a second emission control signal. The sixth transistor T6 includes a first electrode connected to the third node NC, a second electrode connected to the reference voltage line VL3, and a gate electrode for receiving the second emission control signal. As an example of the present disclosure, the sixth transistor T6 may be connected to the j-th emission control line EMLj and may receive the j-th emission control signal EMj as the "second emission control signal". The sixth transistor T6 electrically connects the third node NC and the reference voltage line VL3 in response to the second emission control signal.

The seventh transistor T7 is connected between the reference voltage line VL3 and the fourth node ND, and receives a fourth scan signal. The seventh transistor T7 includes a first electrode connected to the fourth node ND, a second electrode connected to the reference voltage line VL3, and a gate electrode for receiving the fourth scan signal. As an example of the present disclosure, the seventh transistor T7 may be connected to the (j−1)-th compensation scan line SCLj−1 and may receive the (j−1)-th compensation scan signal SCj−1 as the "fourth scan signal". The seventh transistor T7 electrically connects the fourth node ND and the reference voltage line VL3 in response to the fourth scan signal. As an example of the present disclosure, the fourth scan signal may be a signal activated prior to the first and second scan signals.

The eighth transistor T8 is connected between the reference voltage line VL3 and the light emitting element ED, and receives a fifth scan signal. The eighth transistor T8 includes a first electrode connected to the anode of the light emitting element ED, a second electrode connected to the reference voltage line VL3, and a gate electrode for receiving the fifth scan signal. As an example of the present disclosure, the eighth transistor T8 may be connected to the j-th write scan line SWLj and may receive the j-th write scan signal SWj as the fifth scan signal. The eighth transistor T8 electrically connects the anode of the light emitting element ED and the reference voltage line VL3 in response to the fifth scan signal. As an example of the present disclosure, the fifth scan signal may be the same signal as the third scan signal.

The light emitting element ED is connected between the second voltage line VL2 for receiving the second driving voltage ELVSS and the fifth transistor T5. An anode of the light emitting element ED is connected to the second electrode of the fifth transistor T5. A cathode of the light emitting element ED is connected to the second voltage line VL2.

Figure 3A:
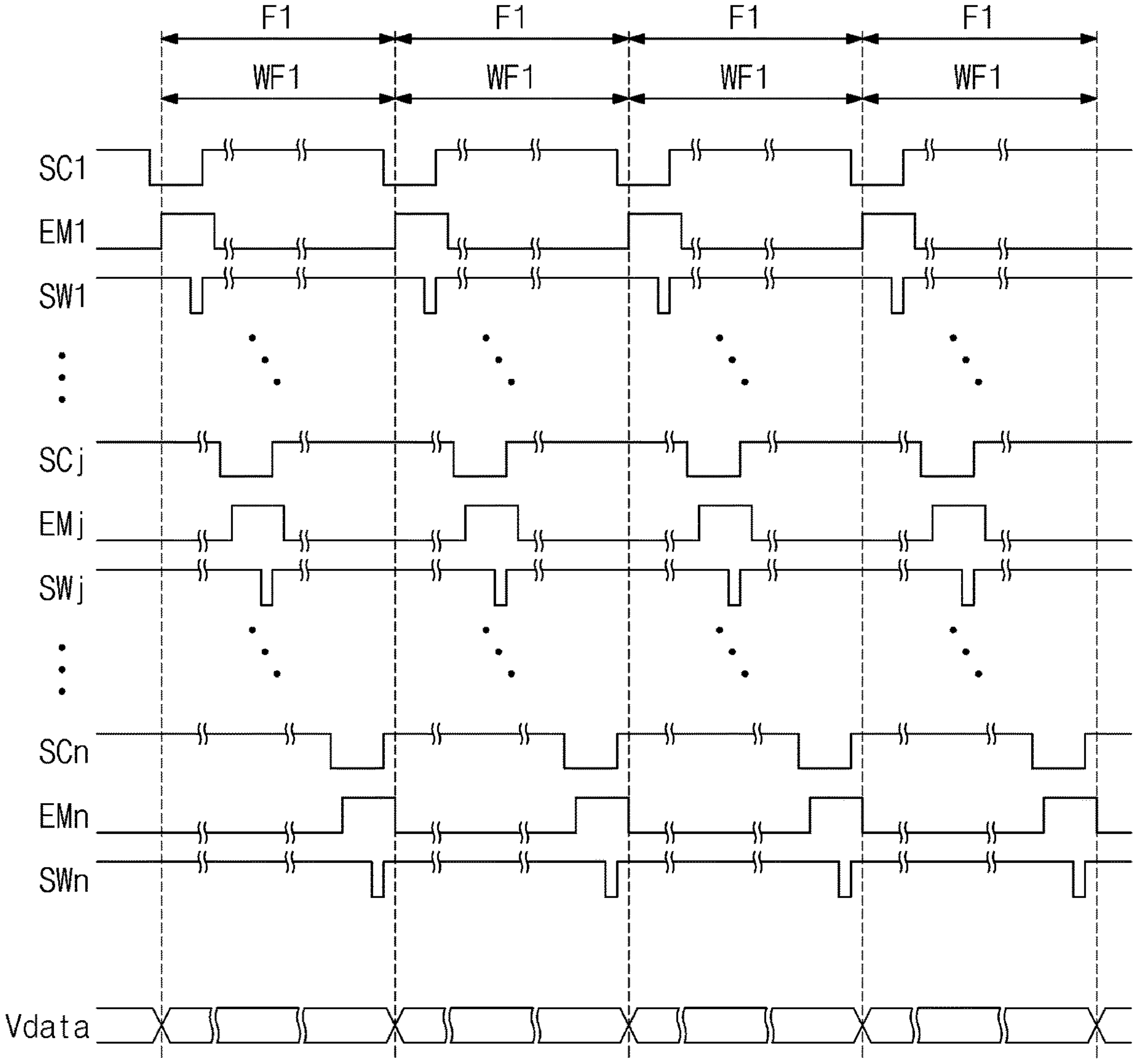
FIGS. 3A and 3B are timing diagrams for describing an operation of a display device, according to an embodiment of the present disclosure.
Figure 3B:
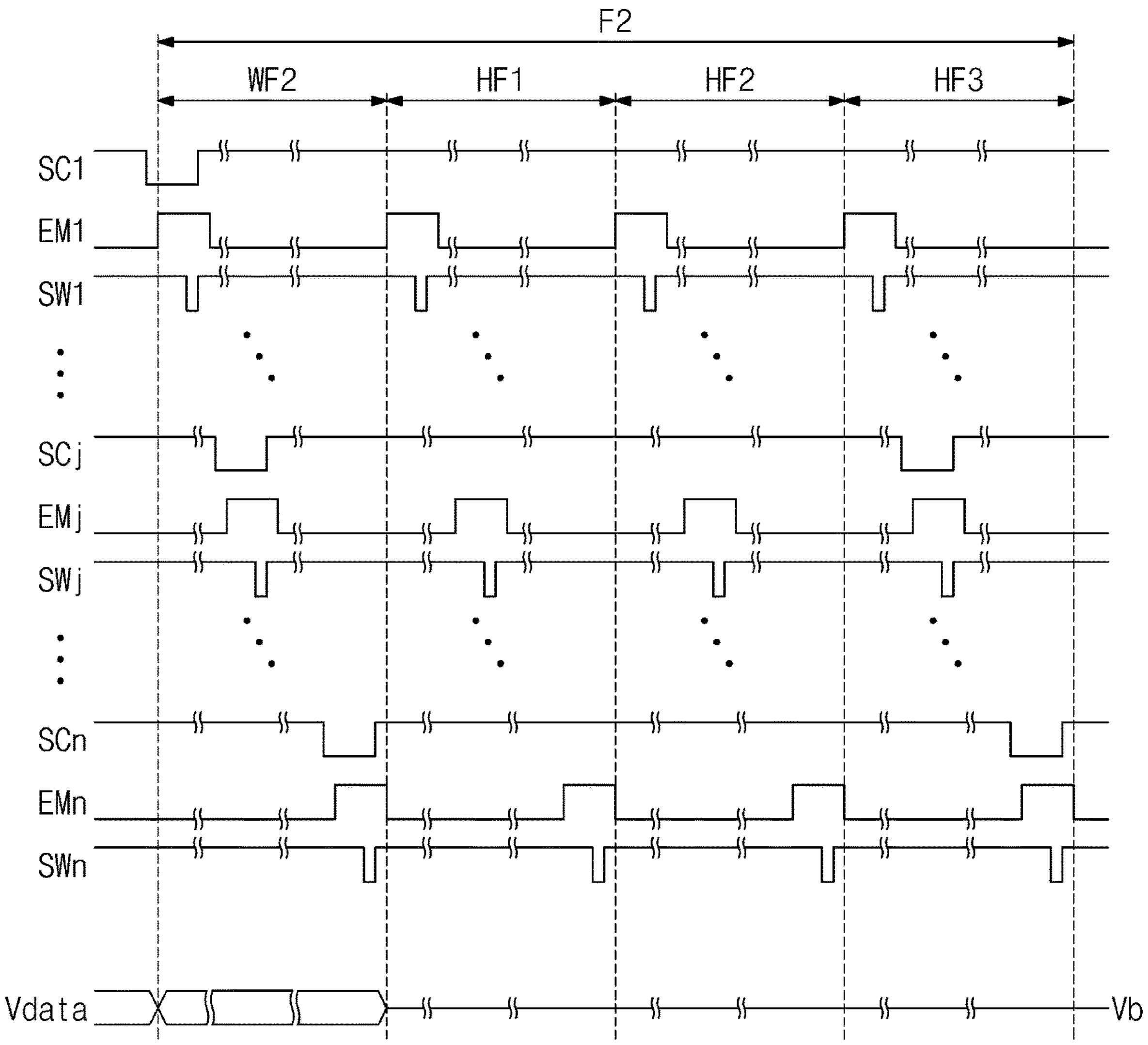

FIG. 3A is a timing diagram for describing that a display device operates at a first operating frequency, according to an embodiment of the present disclosure. FIG. 3B is a timing diagram for describing that a display device operates at a second operating frequency, according to an embodiment of the present disclosure.

Referring to FIGS. 1 to 3A, an operating frequency of the display device DD may be varied. In an embodiment of the present disclosure, the first operating frequency may be the highest operating frequency at which the display device DD is capable of operating. In an embodiment, for example, the first operating frequency may be 360 Hz. The first operating frequency may be referred to as a "reference frequency" or "maximum frequency".

When the display device DD operates at the first operating frequency, the scan driving circuit 300 may sequentially activate compensation scan signals SC1, SCj, and SCn and write scan signals SW1, SWj, and SWn to be at low levels during each of a plurality of first frames F1. During each of the plurality of first frames F1, the emission driving circuit 350 may sequentially deactivate first emission control signals EM1, EMj, and EMn to be at high levels. FIG. 3A shows that activation levels of the compensation scan signals SC1, SCj, and SCn, the write scan signals SW1, SWj, and SWn, and the first emission control signals EM1, EMj, and EMn are low levels, and deactivation levels thereof are high levels, but the present disclosure is not limited thereto. For another example, when the first to eighth transistors T1 to T8 shown in FIG. 2 are N-type transistors, the activation levels of the compensation scan signals SC1, SCj, and SCn, the write scan signals SW1, SWj, and SWn and the first emission control signals EM1, EMj, and EMn may be high levels, and deactivation levels thereof may be low levels.

When the first operating frequency is the maximum frequency, each first frame F1 may include only a first write frame WF1. In this case, the duration of the first write frame WF1 may be equal to the duration of each first frame F1.

Referring to FIGS. 1 to 3B, the display device DD may operate at a second operating frequency lower than the first operating frequency. As an example of the present disclosure, the second operating frequency is 90 Hz, but the second operating frequency is not limited thereto. The operating frequency of the display device DD may be changed in various manners. In an embodiment, the operating frequency of the display device DD may be determined depending on characteristics of the image signal RGB (e.g., a video or a still image).

When the display device DD operates at the second operating frequency lower than the first operating frequency, a duration of each second frame F2 may be greater than a duration of each first frame F1 shown in FIG. 3A. As an example of the present disclosure, the duration of each second frame F2 may be four times the duration of each first frame F1. Each of the second frames F2 may include a second write frame WF2 and holding frames HF1, HF2, and HF3. The second write frame WF2 may have the same duration as the duration of the first write frame WF1 shown in FIG. 3A.

During the second write frame WF2, the scan driving circuit 300 may sequentially activate the compensation scan signals SC1, SCj, and SCn and the write scan signals SW1, SWj, and SWn to be at activation levels (e.g., low levels). During the second write frame WF2, the emission driving circuit 350 may sequentially deactivate the first emission control signals EM1, EMj, and EMn to be at deactivation levels (e.g., high levels).

During the holding frames HF1, HF2, and HF3, the scan driving circuit 300 maintains the compensation scan signals SC1, SCj, and SCn at deactivation levels (e.g., high levels). However, during the holding frames HF1, HF2, and HF3, the scan driving circuit 300 may sequentially activate the write scan signals SW1, SWj, and SWn. Besides, during the holding frames HF1, HF2, and HF3, the emission driving circuit 350 may sequentially deactivate the first emission control signals EM1, EMj, and EMn to be at deactivation levels (e.g., high levels). That is, even when the operating frequency of the display device DD changes to the second operating frequency, the write scan signals SW1, SWj, and SWn and the first emission control signals EM1, EMj, and EMn may still be output at the maximum frequency (i.e., the first operating frequency). FIG. 3B shows an embodiment in which the three holding frames HF1, HF2, and HF3 are included in the second frame F2, but the present disclosure is not limited thereto. For another example, the number of holding frames included in the second frame F2 may vary depending on the magnitude of the second operating frequency.

In the meantime, during the holding frames HF1, HF2, and HF3, the i-th data voltage Vdata may be held as a bias voltage Vb. The bias voltage Vb may be a voltage maintained at a constant voltage level during the holding frames HF1, HF2, and HF3. As an example of the present disclosure, the bias voltage Vb may have a voltage level corresponding to a black grayscale, but is not limited thereto.

Figure 4A:
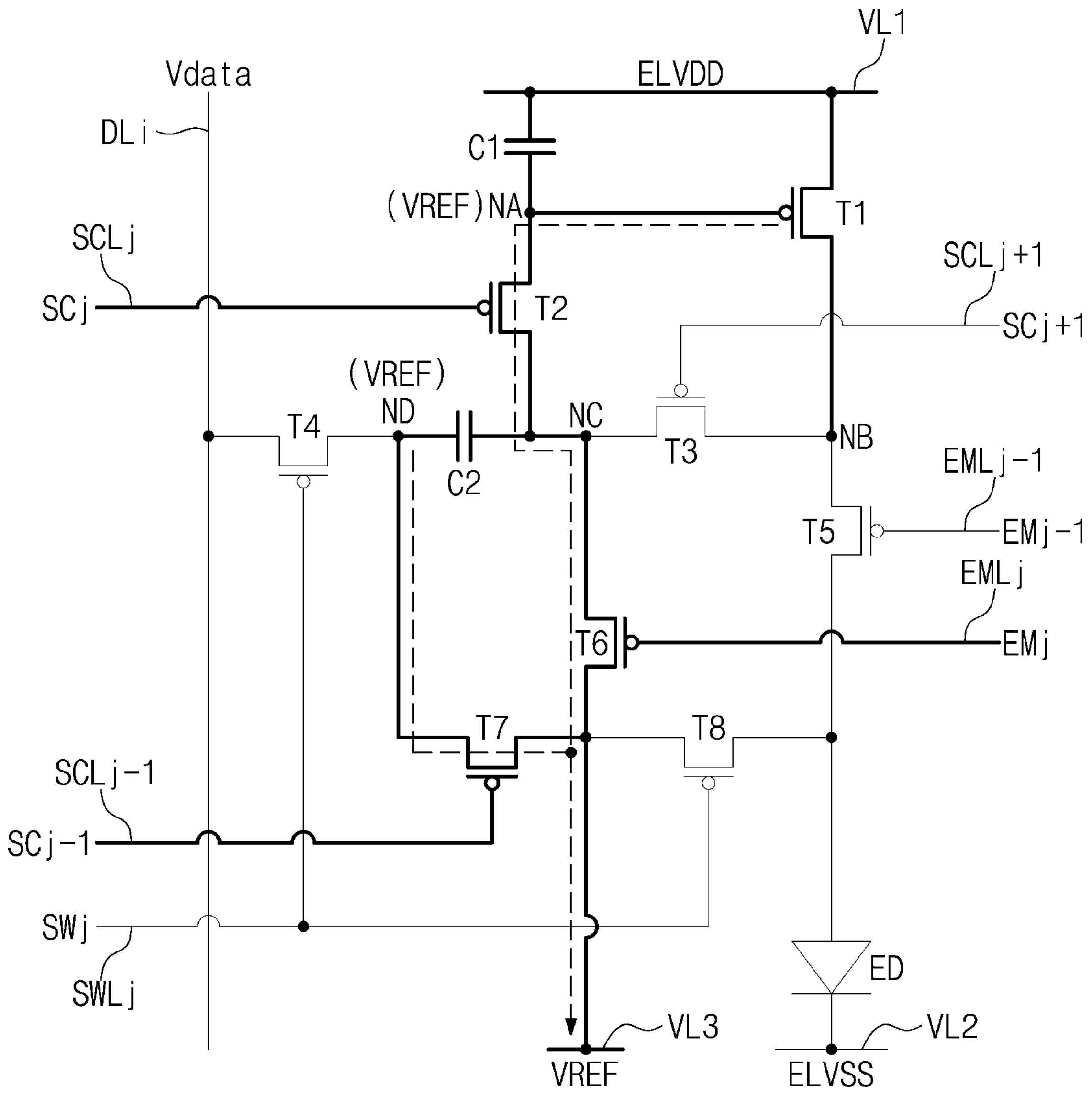
FIGS. 4A and 4B are diagrams for describing an operation of a pixel during a first period, according to an embodiment of the present disclosure.
Figure 4B:
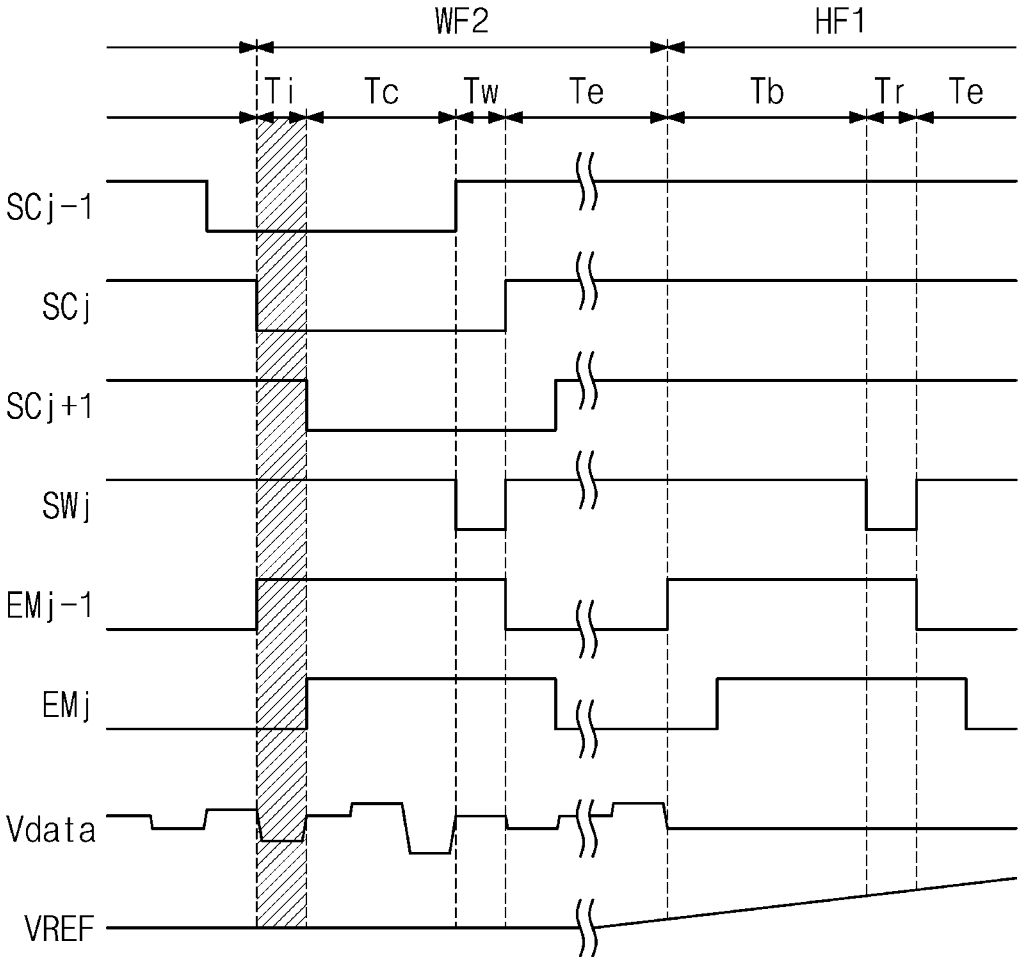
Figure 5A:
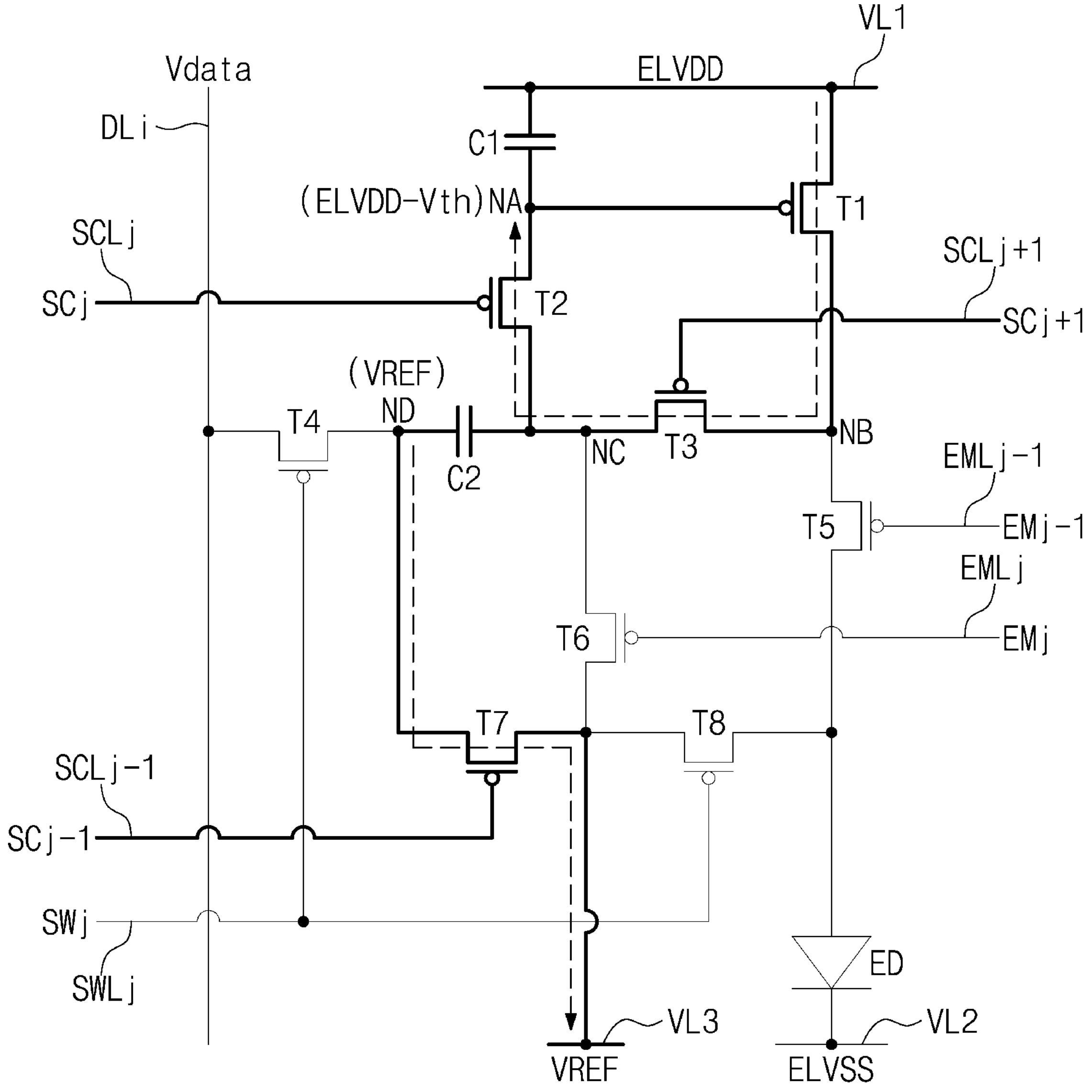
FIGS. 5A and 5B are diagrams for describing an operation of a pixel during a second period, according to an embodiment of the present disclosure.
Figure 5B:
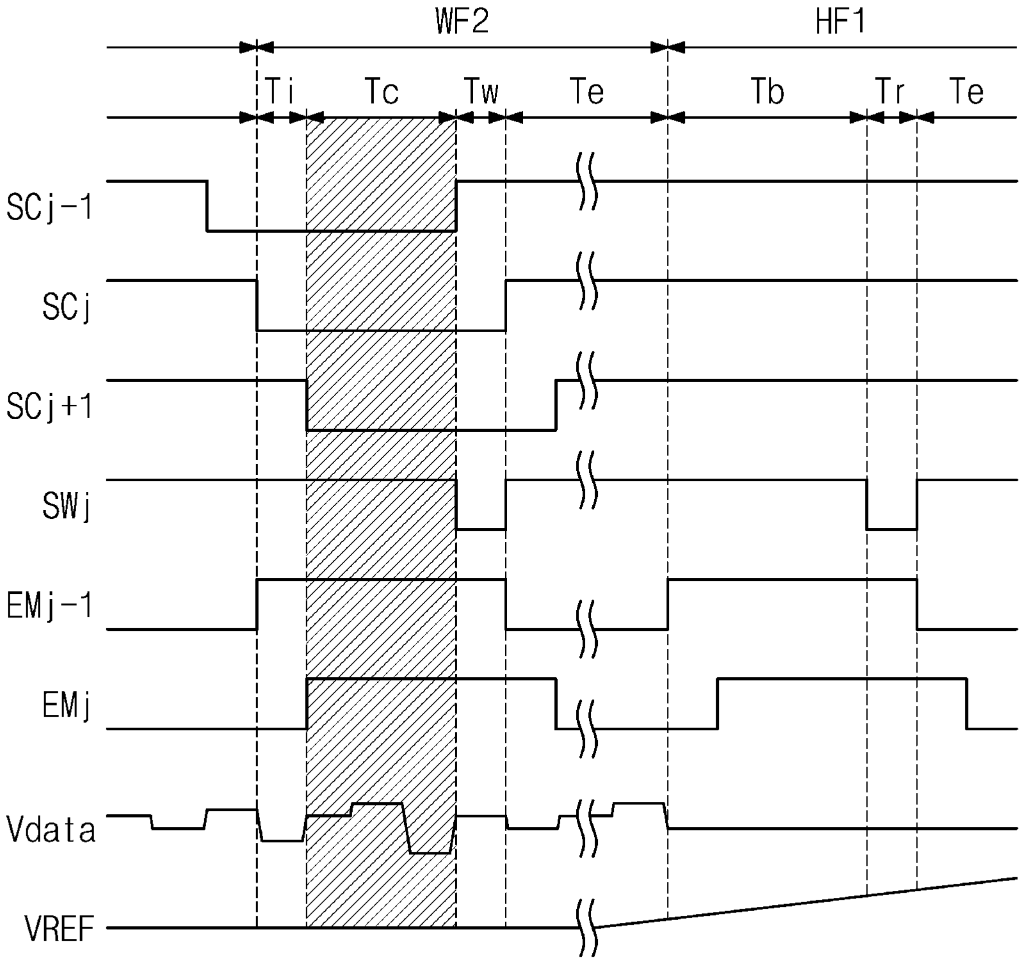
Figure 6A:
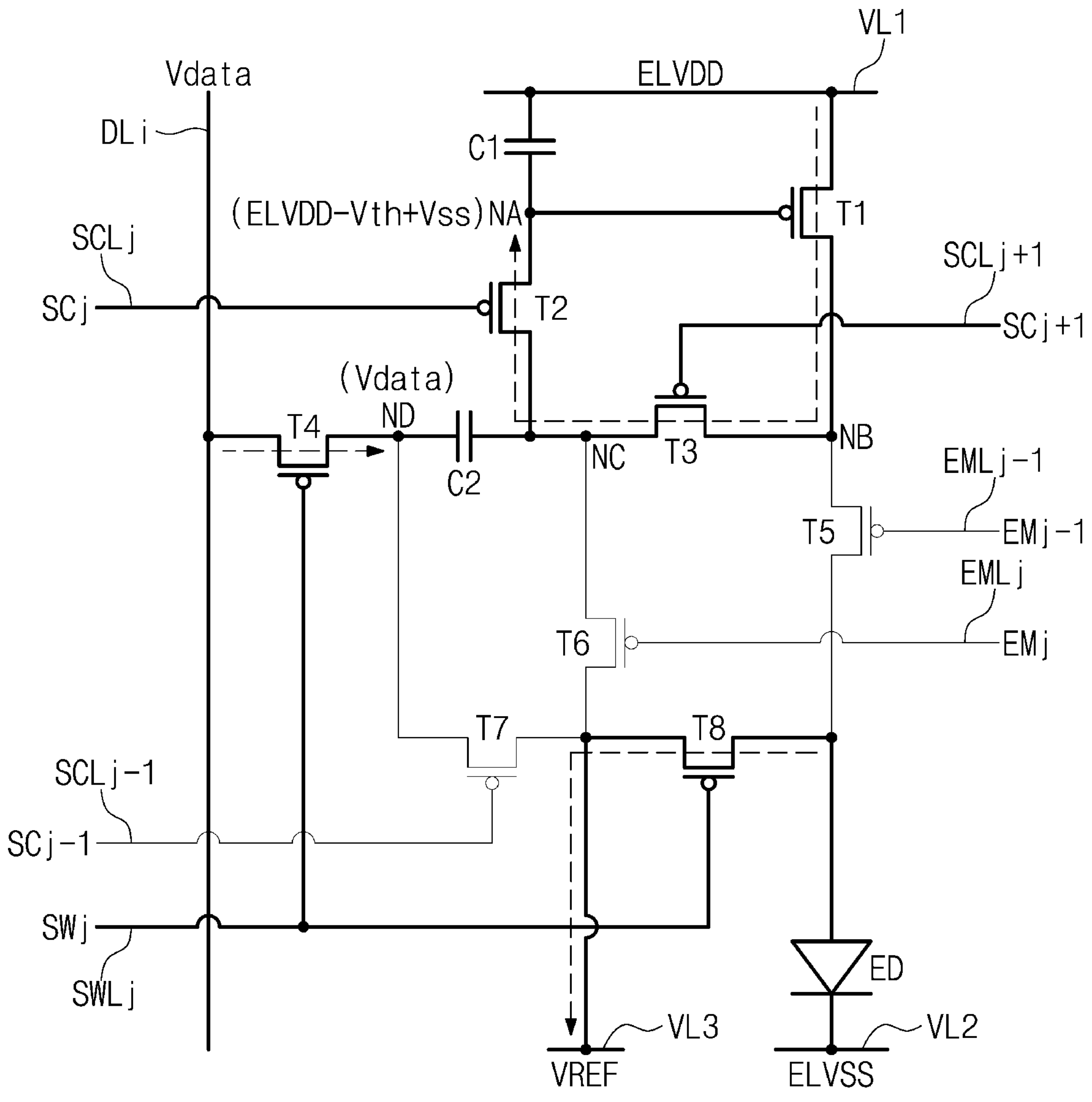
FIGS. 6A and 6B are diagrams for describing an operation of a pixel during a third period, according to an embodiment of the present disclosure.
Figure 6B:
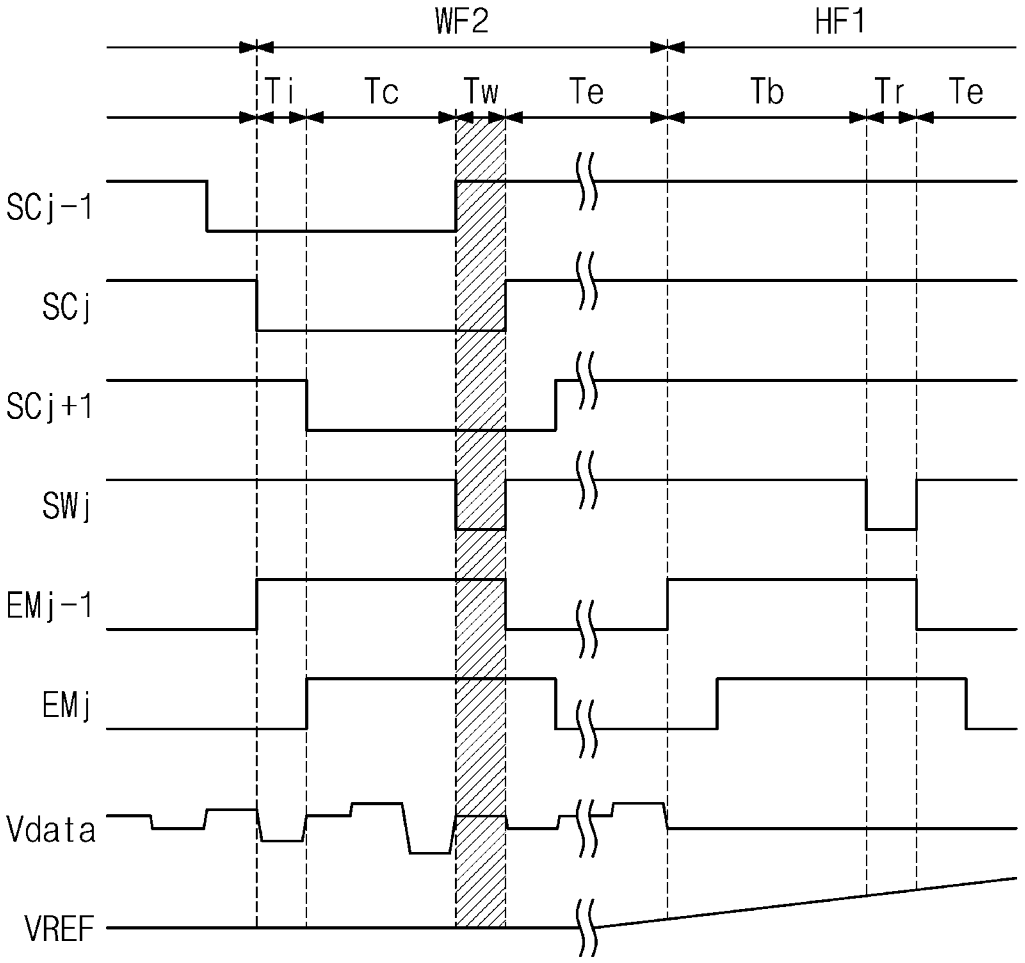
Figure 6C:
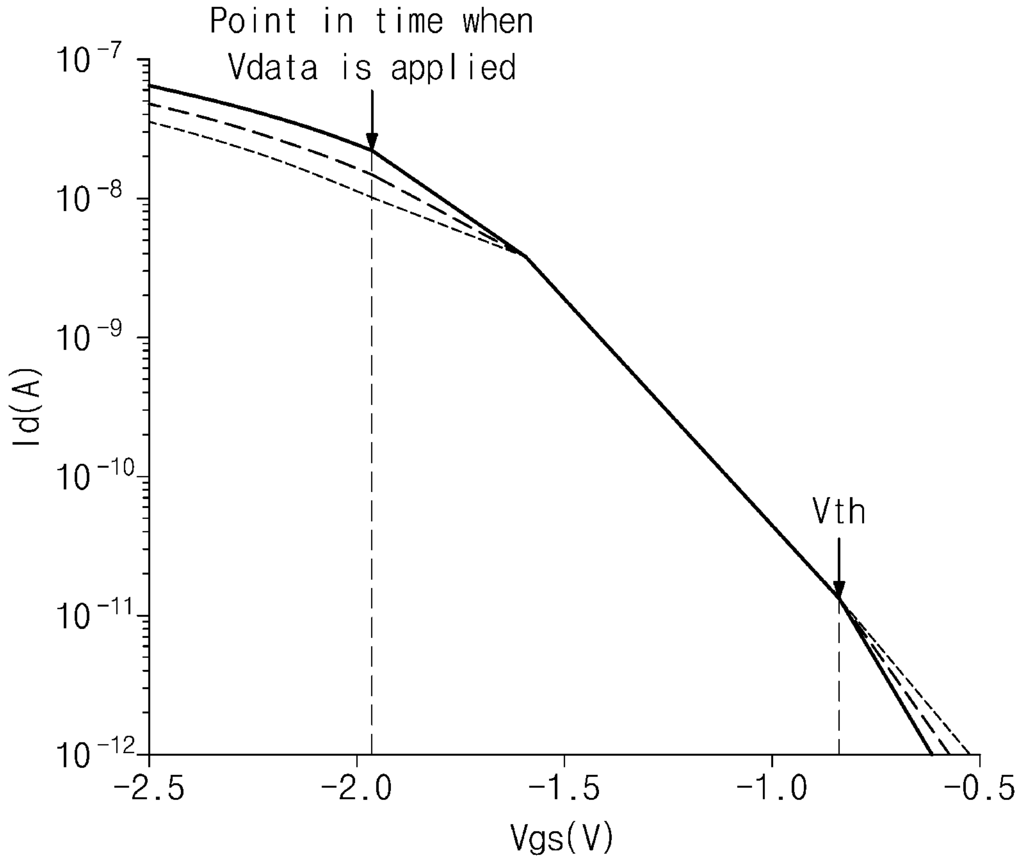
FIG. 6C is a diagram for describing a current deviation compensation process, according to an embodiment of the present disclosure.
Figure 7A:
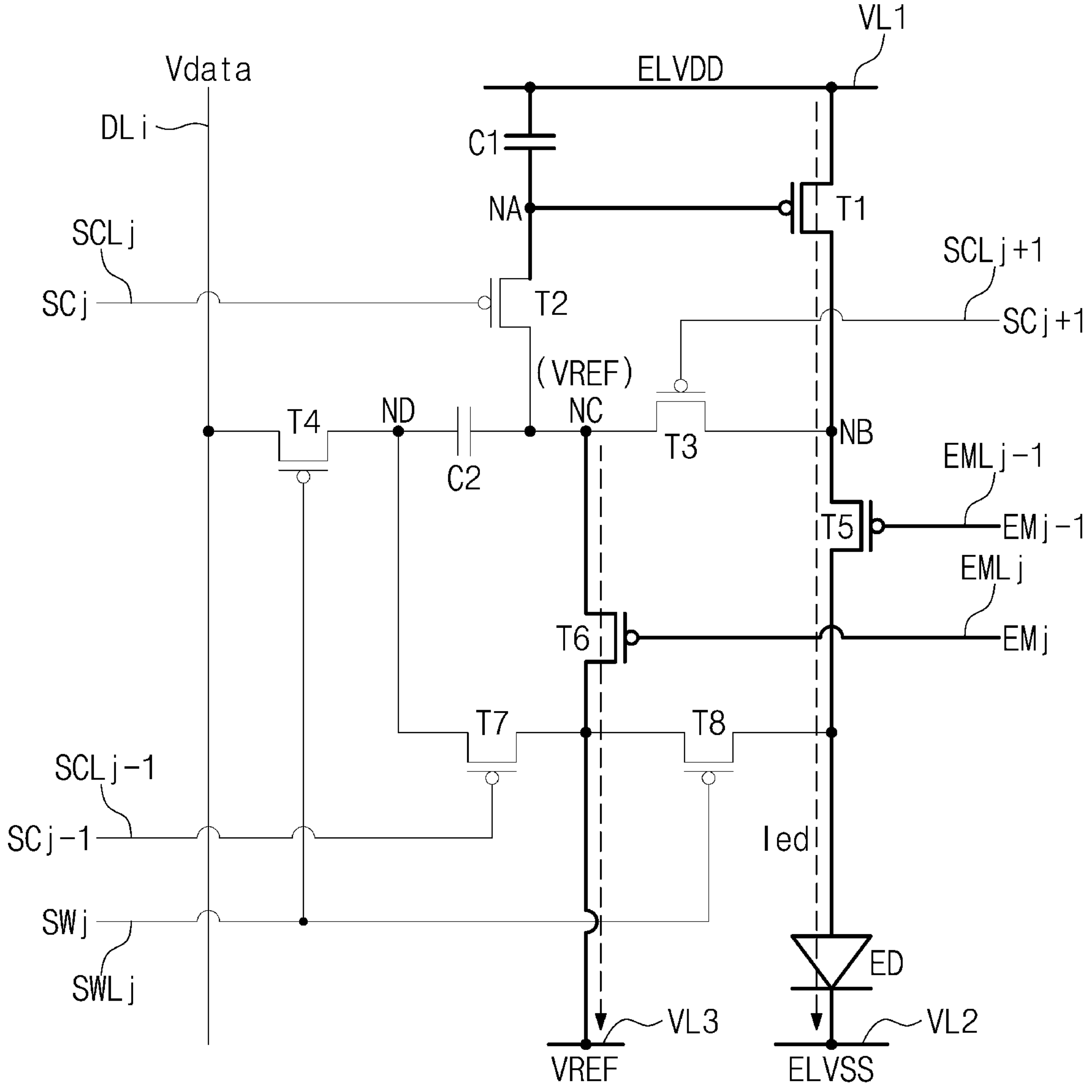
FIGS. 7A and 7B are diagrams for describing an operation of a pixel during a fourth period, according to an embodiment of the present disclosure.
Figure 7B:
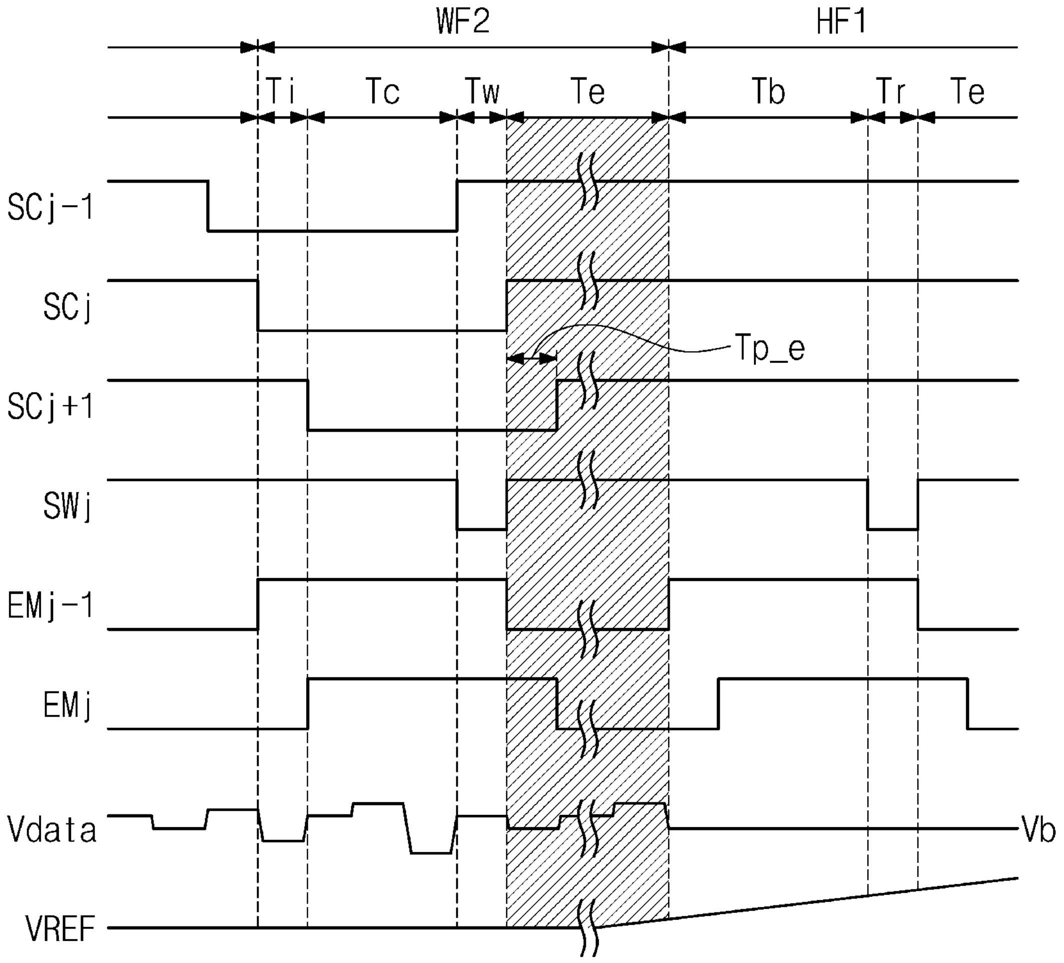
Figure 8A:
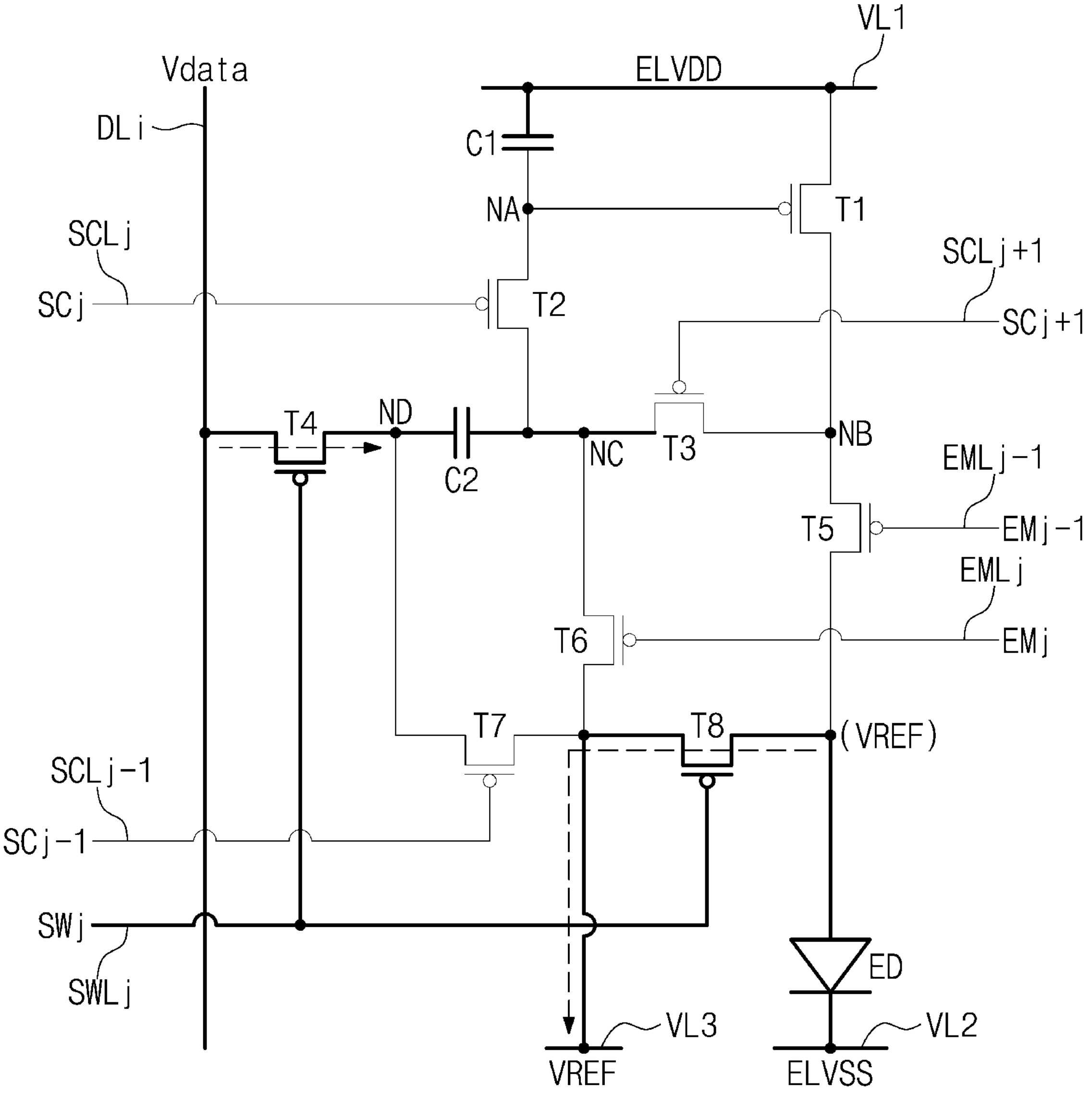
FIGS. 8A and 8B are diagrams for describing an operation of a pixel during a fifth period, according to an embodiment of the present disclosure.
Figure 8B:
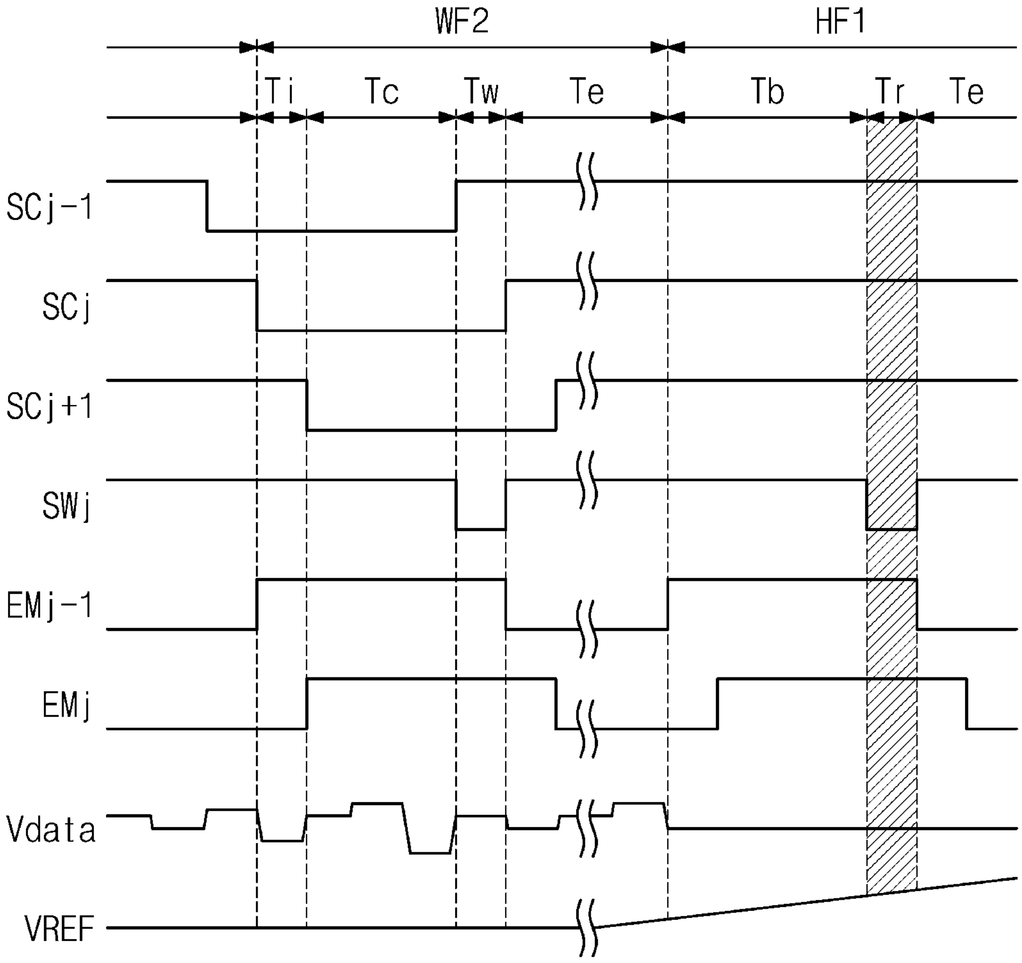

FIGS. 4A and 4B are diagrams for describing an operation of a pixel during a first period, according to an embodiment of the present disclosure. FIGS. 5A and 5B are diagrams for describing an operation of a pixel during a second period, according to an embodiment of the present disclosure. FIGS. 6A to 6C are diagrams for describing an operation of a pixel during a third period, according to an embodiment of the present disclosure. FIGS. 7A and 7B are diagrams for describing an operation of a pixel during a fourth period, according to an embodiment of the present disclosure. FIGS. 8A and 8B are diagrams for describing an operation of a pixel during a fifth period, according to an embodiment of the present disclosure.

FIGS. 4B, 5B, 6B, 7B, and 8B illustrate an operation of the pixel PXij during the second write frame WF2 and the first holding frame HF1 shown in FIG. 3B. However, the operation of the pixel PXij may be equally implemented during the first write frame WF1. In FIGS. 4B, 5B, 6B, 7B, and 8B, the second write frame WF2 includes first to fourth periods Ti, Tc, Tw, and Te, and the first holding frame HF1 includes a fifth period Tr.

Referring to FIGS. 4A and 4B, during the first period Ti of the second write frame WF2, each of the (j−1)-th compensation scan signal SCj−1 (i.e., the fourth scan signal), the j-th compensation scan signal SCj (i.e., the first scan signal) and the j-th emission control signal EMj (i.e., the second emission control signal) has an activation level. Accordingly, during the first period Ti, the seventh transistor T7 is turned on in response to the (j−1)-th compensation scan signal SCj−1, the second transistor T2 is turned on in response to the j-th compensation scan signal SCj, and the sixth transistor T6 is turned on in response to the j-th emission control signal EMj.

The reference voltage VREF is applied to the fourth node ND through the turned-on seventh transistor T7, and applied to the first and third nodes NA and NC through the turned-on second and sixth transistors T2 and T6. Accordingly, during the first period Ti, the first, third, and fourth nodes NA, NC, and ND may be initialized to the reference voltage VREF. That is, the first period Ti may be an initialization period in which the first node NA, the third node NC, and the fourth node ND are initialized to the reference voltage VREF.

During the first period Ti of the second write frame WF2, each of the (j+1)-th compensation scan signal SCj+1 (i.e., the second scan signal), the j-th write scan signal SWj (i.e., the third and fifth scan signals), and the j−1st emission control signal EMj−1 (i.e., the first emission control signal) has the deactivation level. Accordingly, during the first period Ti, the third transistor T3 is turned off in response to the (j+1)-th compensation scan signal SCj+1, the fourth and eighth transistors T4 and T8 are turned off in response to the j-th write scan signal SWj, and the fifth transistor T5 is turned off in response to the (j−1)-th emission control signal EMj−1. As such, because the third transistor T3 is turned off during the first period Ti, a constant current path from the first voltage line VL1 to the reference voltage line VL3 may be prevented from being formed, thereby reducing power consumption.

Referring to FIGS. 5A and 5B, the second period Tc occurs after the first period Ti. During the second period Tc of the second write frame WF2, each of the (j−1)-th compensation scan signal SCj−1 (i.e., the fourth scan signal), the j-th compensation scan signal SCj (i.e., the first scan signal), and the (j+1)-th compensation scan signal SCj+1 (i.e., the second scan signal) has the activation level. Accordingly, the second, third, and seventh transistors T2, T3, and T7 are turned on during the second period Tc. The first driving voltage ELVDD supplied through the first voltage line VL1 is applied to the first node NA via the turned-on first to third transistors T1, T2, and T3. During the second period Tc, the first node NA may have a potential of "ELVDD-Vth". Here, "Vth" may be a threshold voltage of the first transistor Ti.

The second period Tc may be a period consecutive to the first period Ti, and a duration of the second period Tc may be greater than a duration of the first period Ti. As an example of the present disclosure, the duration of the second period Tc may be three or more times greater than the duration of the first period Ti. When the duration of the second period Tc is long, the potential of the first node NA may be sufficiently compensated so as to have a voltage value corresponding to a deviation and change in the threshold voltage Vth of the first transistor T1.

Even during the second period Tc, the potential of the fourth node ND may be maintained at the reference voltage VREF through the turned-on seventh transistor T7.

During the second period Tc of the second write frame WF2, each of the j-th write scan signals SWj, and the (j−1)-th and j-th emission control signals EMj−1 and EMj have the deactivation level. Accordingly, during the second period Tc, the fourth and eighth transistors T4 and T8 are turned off in response to the j-th write scan signal SWj, and the fifth and sixth transistors T5 and T6 are turned off in response to the (j−1)-th and j-th emission control signals EMj−1 and EMj, respectively.

Referring to FIGS. 6A and 6B, the third period Tw occurs after the second period Tc. During the third period Tw of the second write frame WF2, each of the j-th write scan signal SWj (i.e., the third and fifth scan signals), the j-th compensation scan signal SCj (i.e., the first scan signal), and the (j+1)-th compensation scan signal SCj+1 (i.e., the second scan signal) has the activation level. Accordingly, during the third period Tw, the second, third, fourth and eighth transistors T2, T3, T4, and T8 are turned on. The i-th data voltage Vdata applied through the i-th data line DLi may be applied to the fourth node ND through the turned-on fourth transistor T4 and may be stored in the second capacitor C2. At this time, a potential VA of the first node NA may be calculated based on the following Equation 1 by the coupling of the first and second capacitors C1 and C2.

$$VA = ELVDD - Vth + \frac{C1}{C1 + C2}(Vdata - VREF) + Vss \qquad \text{[Equation 1]}$$

When the duration of the second period Tc becomes long, a voltage higher than the threshold voltage Vth of the first transistor T1 may be sensed at a gate-source node of the first transistor T1. Accordingly, when the i-th data voltage Vdata of a high grayscale is applied, as shown in FIG. 6C, a deviation (i.e., a current deviation) in drain current Id may occur due to a slope deviation at the threshold voltage Vth or less of the first transistor T1.

In order to compensate this current deviation, the first to third transistors T1, T2, and T3 may be turned on during the third period Tw. A current path from the first voltage line VL1 to the first node NA via the second and third nodes NB and NC is formed through the turned-on first to third transistors T1, T2, and T3. In this case, a current draining to the first node NA through the first to third transistors T1 to T3 may be referred to as a "sink current". The magnitude of the sink current depends on the slope deviation at the threshold voltage Vth or less of the first transistor T1. The potential VA of the first node NA during the third period Tw may be changed to "ELVDD-Vth+Vss" by the sink current. Here, "Vss" may be a voltage corresponding to the slope deviation at the threshold voltage Vth or less of the first transistor T1. Accordingly, the voltage corresponding to the slope deviation at the threshold voltage Vth or less of the first transistor T1 may be stored (or reflected) in the first node NA.

In the meantime, the potential of the anode of the light emitting element ED may be maintained as the reference voltage VREF through the eighth transistor T8, which is turned on even during the third period Tw.

As an example of the present disclosure, the third period Tw may be a period consecutive to the second period Tc, and a duration of the third period Tw is equal to the duration of the first period Ti and may be shorter than the duration of the second period Tc.

During the third period Tw of the second write frame WF2, each of the (j−1)-th compensation scan signal SCj−1 and the (j−1)-th and j-th emission control signals EMj−1 and EMj has the deactivation level. Accordingly, during the third period Tw, the seventh transistor T7 is turned off in response to the (j−1)-th compensation scan signal SCj−1, and the fifth and sixth transistors T5 and T6 are turned off in response to the (j−1)-th and j-th emission control signals EMj−1 and EMj, respectively.

Referring to FIGS. 7A and 7B, the fourth period Te occurs after the third period Tw. During the fourth period Te of the second write frame WF2, each of the j-th compensation scan signal SCj and the j-th write scan signal SWj has the deactivation level. Accordingly, the second, third, and eight transistors T2, T3, and T8 are turned off during the fourth period Te.

During the fourth period Te of the second write frame WF2, the (j−1)-th emission control signal EMj−1 has an activation level. Accordingly, during the fourth period Te, the fifth transistor T5 is turned on in response to the (j−1)-th emission control signal EMj−1. Accordingly, a current flowing from the first voltage line VL1 to the second node NB through the first transistor T1 may be applied to the light emitting element ED through the turned-on fifth transistor T5. An emission current led flowing to the light emitting element ED may be controlled depending on a voltage level of the first node NA, and the light emitting element ED may output light corresponding to the emission current led. Accordingly, the fourth period Te may be an emission period in which the light emitting element ED emits light. In the meantime, the first to third periods Ti, Tc, and Tw may be a non-emission period in which the light emitting element ED does not emit light.

The emission current led depends on the threshold voltage Vth of the first transistor T1. The deviation in the threshold voltage Vth of the first transistor T1 may occur depending on locations of the pixels PX (see FIG. 1), and may be shifted due to degradation according to operating time. In detail, because the degree of change (or deterioration) of the threshold voltage Vth of the first transistor T1 is different for each pixel PX, the shift degree of the threshold voltage Vth of the first transistor T1 is also different for each pixel PX.

As described above in FIGS. 5A and 5B, as the duration of the second period Tc is sufficiently long regardless of an operating frequency, the deviation in the threshold voltage Vth and a change in the threshold voltage Vth may be sufficiently compensated. Additionally, as shown in FIGS. 6A and 6B, the current deviation may be compensated by turning on the first to third transistor T1, T2, and T3 during the third period Tw such that the voltage Vss corresponding to the slope deviation at the threshold voltage Vth or less of the first transistor T1 is stored or reflected in the first node NA. Accordingly, a luminance deviation may be effectively prevented from occurring for each pixel due to the current deviation in a high grayscale area.

As an example of the present disclosure, during a specific period (hereinafter referred to as a "preceding emission period" Tp_e (see FIG. 3B)) of the fourth period Te, the third transistor T3 may be turned on in response to the (j+1)-th compensation scan signal SCj+1. However, because the j-th emission control signal EMj is inactive during the preceding emission period Tp_e, the sixth transistor T6 may be turned off. Accordingly, the emission current led may not leak through the third transistor T3 during the preceding emission period Tp_e.

Referring to FIGS. 8A and 8B, when the first holding frame HF1 among the holding frames HF1, HF2, and HF3 (see FIG. 3B) starts, the i-th data voltage Vdata may be held as the bias voltage Vb. The bias voltage Vb may be a voltage maintained at a constant voltage level during the holding frames HF1, HF2, and HF3. As an example of the present disclosure, the bias voltage Vb may have a voltage level corresponding to a black grayscale, but is not limited thereto. During the holding frames HF1, HF2, and HF3, each of the (j−1)-th compensation scan signal SCj−1, the j-th compensation scan signal SCj and the (j+1)-th compensation scan signal SCj+1 maintains the deactivation level. The (j−1)-th emission control signal EMj−1 defines a non-emission period of the first holding frame HF1. That is, the (j−1)-th emission control signal EMj−1 has the deactivation level during the non-emission period of the first holding frame HF1. Each of the (j−1)-th and j-th emission control signals EMj−1 and EMj may include a deactivation period having the deactivation level within the first holding frame HF1.

The non-emission period includes a fifth period Tr in which the j-th write scan signal SWj is in an active state and a blank period Tb in which the j-th write scan signal SWj is in an inactive state. That is, the fifth period Tr may be an activation period in which the j-th write scan signal SWj has an activation level. The fifth period Tr may overlap the deactivation period of each of the (j−1)-th and j-th emission control signals EMj−1 and EMj.

During the fifth period Tr, the fourth and eighth transistors T4 and T8 may be turned on in response to the j-th write scan signal SWj. Accordingly, during the fifth period Tr, the anode of the light emitting element ED may be reset to the reference voltage VREF through the turned-on eighth transistor T8. The anode of the light emitting element ED may be periodically reset in synchronization with the j-th write scan signal SWj being periodically activated during the holding frames HF1, HF2, and HF3. That is, the fifth period Tr may be referred to as a reset period in which the anode of the light emitting element ED is reset.

When the fifth period Tr ends, an emission period (i.e., the fourth period Te) may start. Because an operation during the emission period Te during the holding frames HF1, HF2, and HF3 is the same as an operation during the fourth period Te of the first and second write frames WF1 and WF2, the description of the operation during the emission period Te of the holding frames HF1, HF2, and HF3 will be omitted.

Figure 9A:
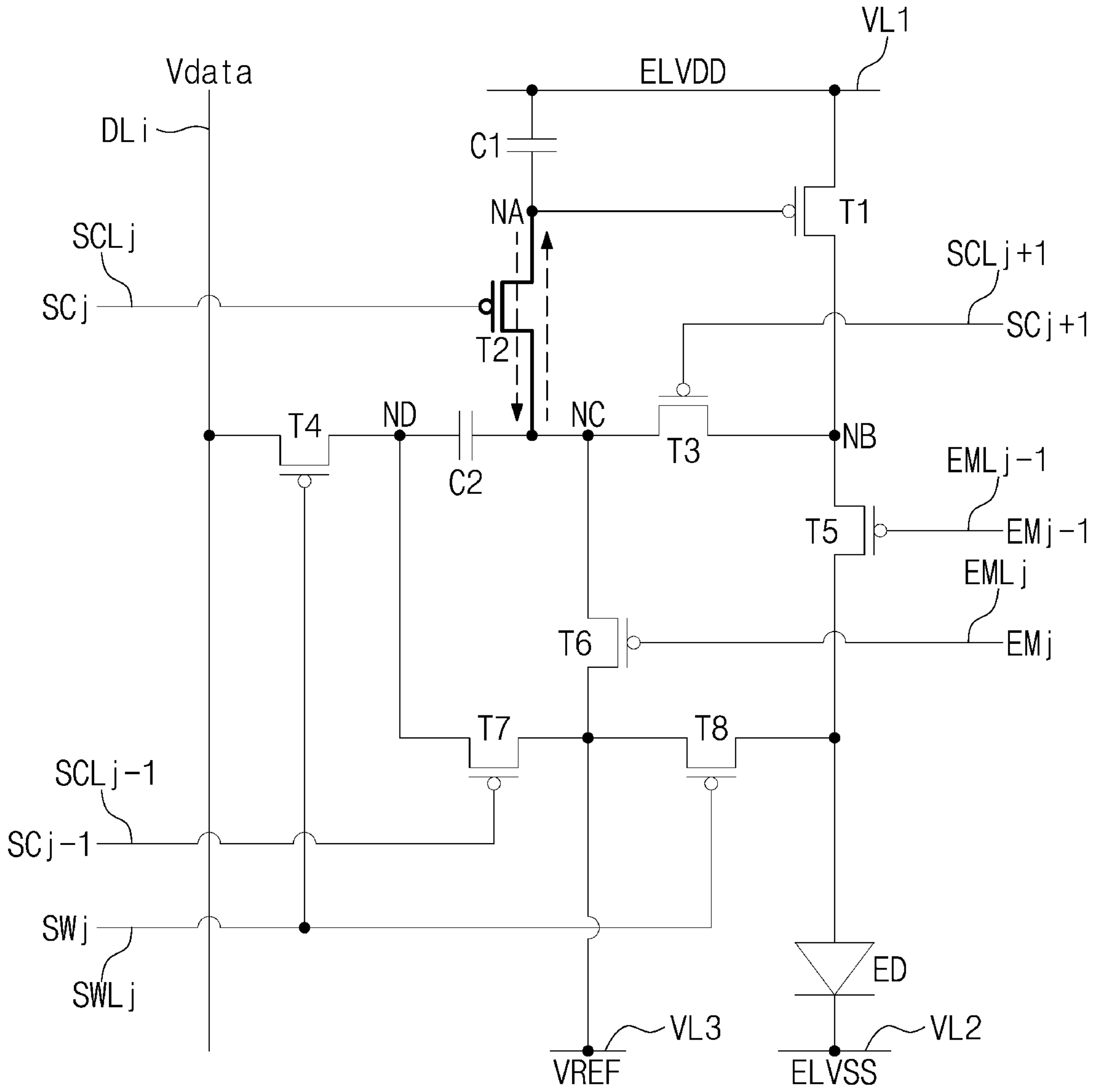
FIGS. 9A and 9B are diagrams for describing operations of holding frames, according to an embodiment of the present disclosure.
Figure 9B:
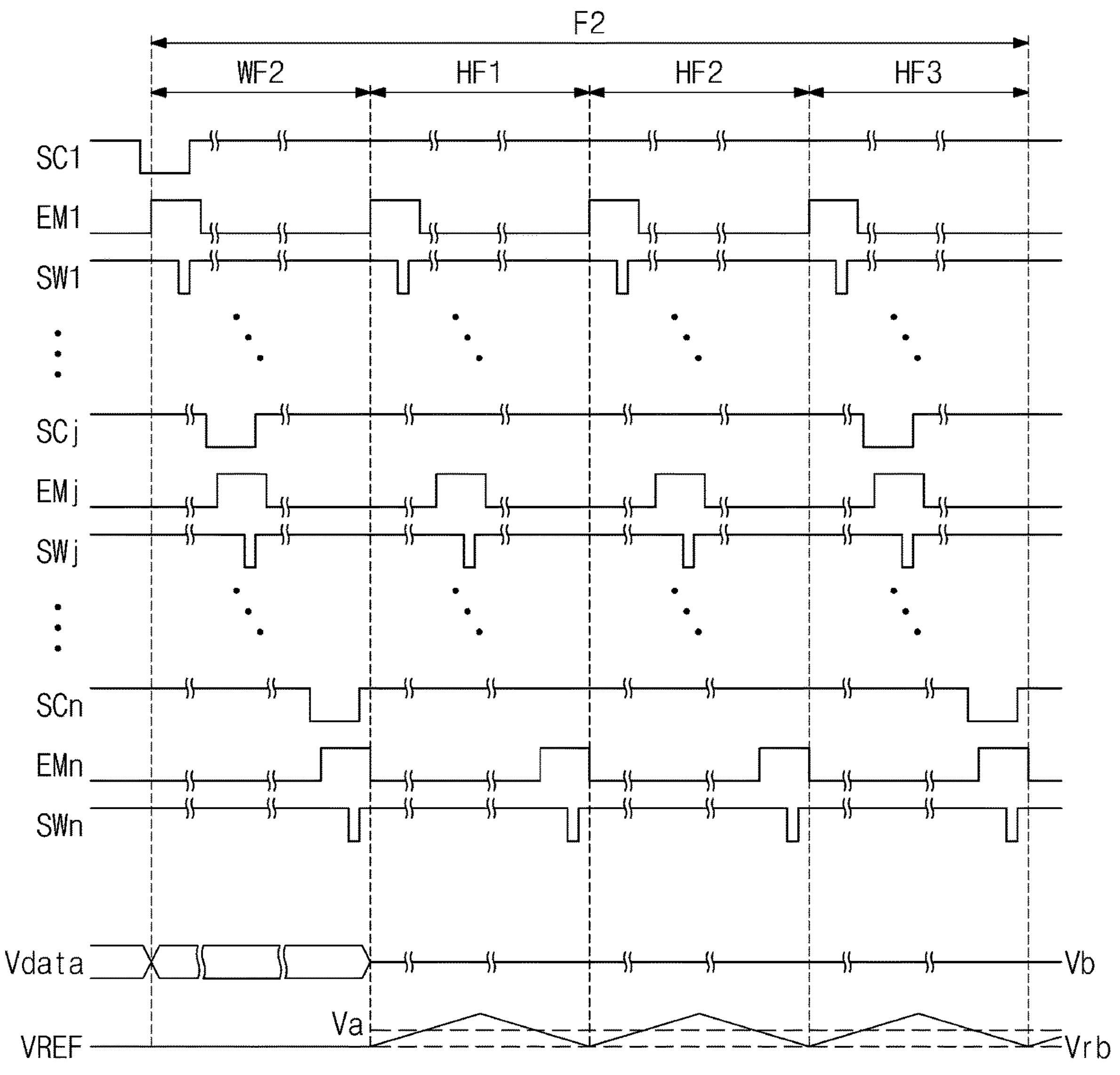

FIGS. 9A and 9B are diagrams for describing operations of holding frames, according to an embodiment of the present disclosure.

Referring to FIGS. 9A and 9B, during the second write frame WF2, the reference voltage VREF may be fixed to a base level Vrb, and may change to a level higher than a base level Vrb during the holding frames HF1, HF2, and HF3. The reference voltage VREF may gradually rise to a level higher than a predetermined reference level Va and then fall. Here, when the reference voltage VREF is lower than the reference level Va, a leakage current may flow from the first node NA to the third node NC. In contrast, when the reference voltage VREF is higher than the reference level Va, an opposite leakage current may flow from the third node NC to the first node NA. That is, a change in potential of the first node NA may be effectively reduced by periodically changing a direction of the leakage current leaking through the second transistor T2. Accordingly, when a voltage level of the reference voltage VREF is changed to have a level higher than the reference level Va and lower than the reference level Va alternately during the holding frames HF1, HF2, and HF3, it is possible to effectively prevent a phenomenon that the potential change in the first node NA is recognized as flicker during an operation at a low frequency.

Figure 10A:
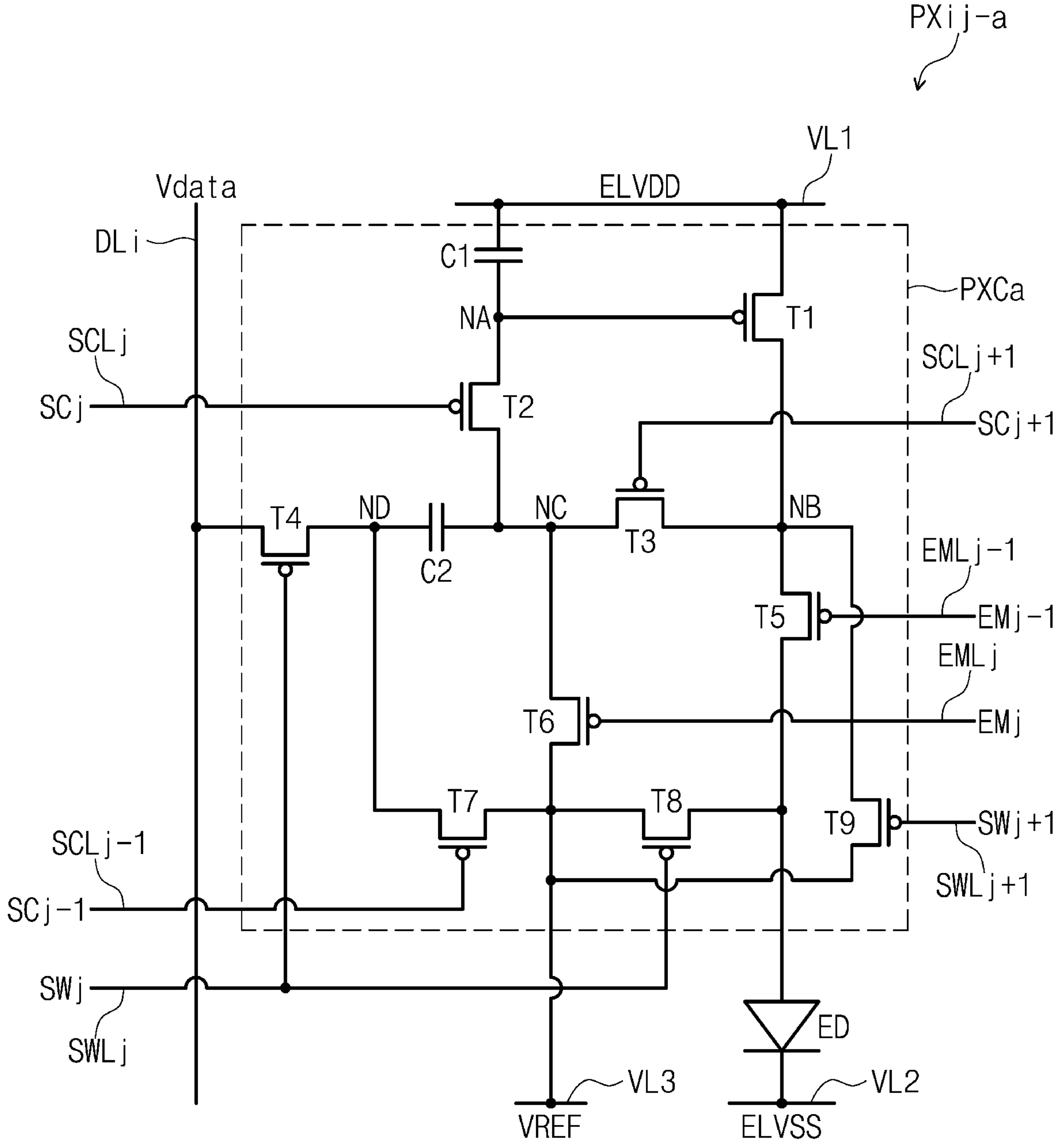
FIG. 10A is a circuit diagram of a pixel, according to another embodiment of the present disclosure.
Figure 10B:
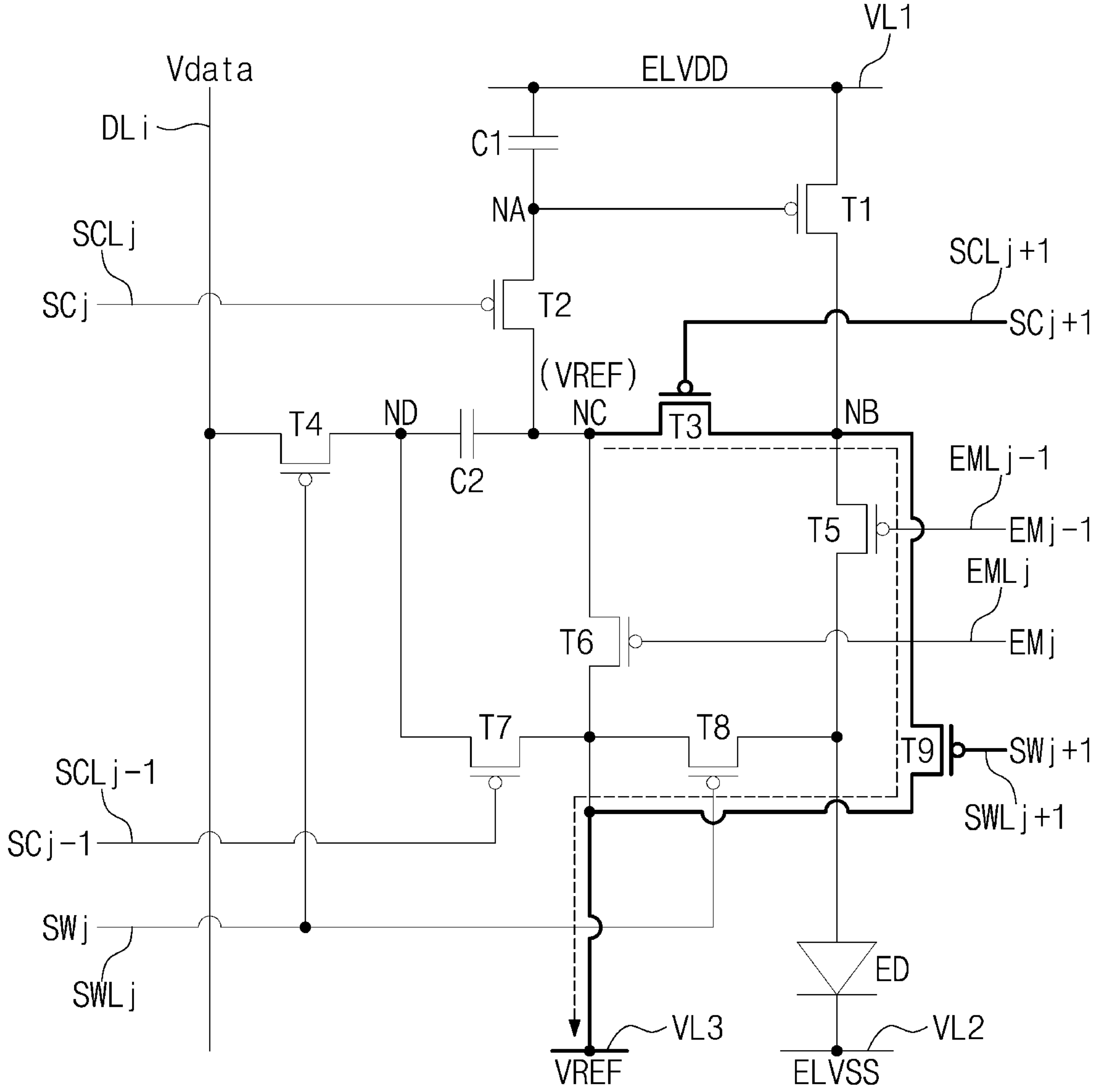
FIGS. 10B and 10C are diagrams for describing an operation of a pixel during a sixth period, according to an embodiment of the present disclosure.
Figure 10C:
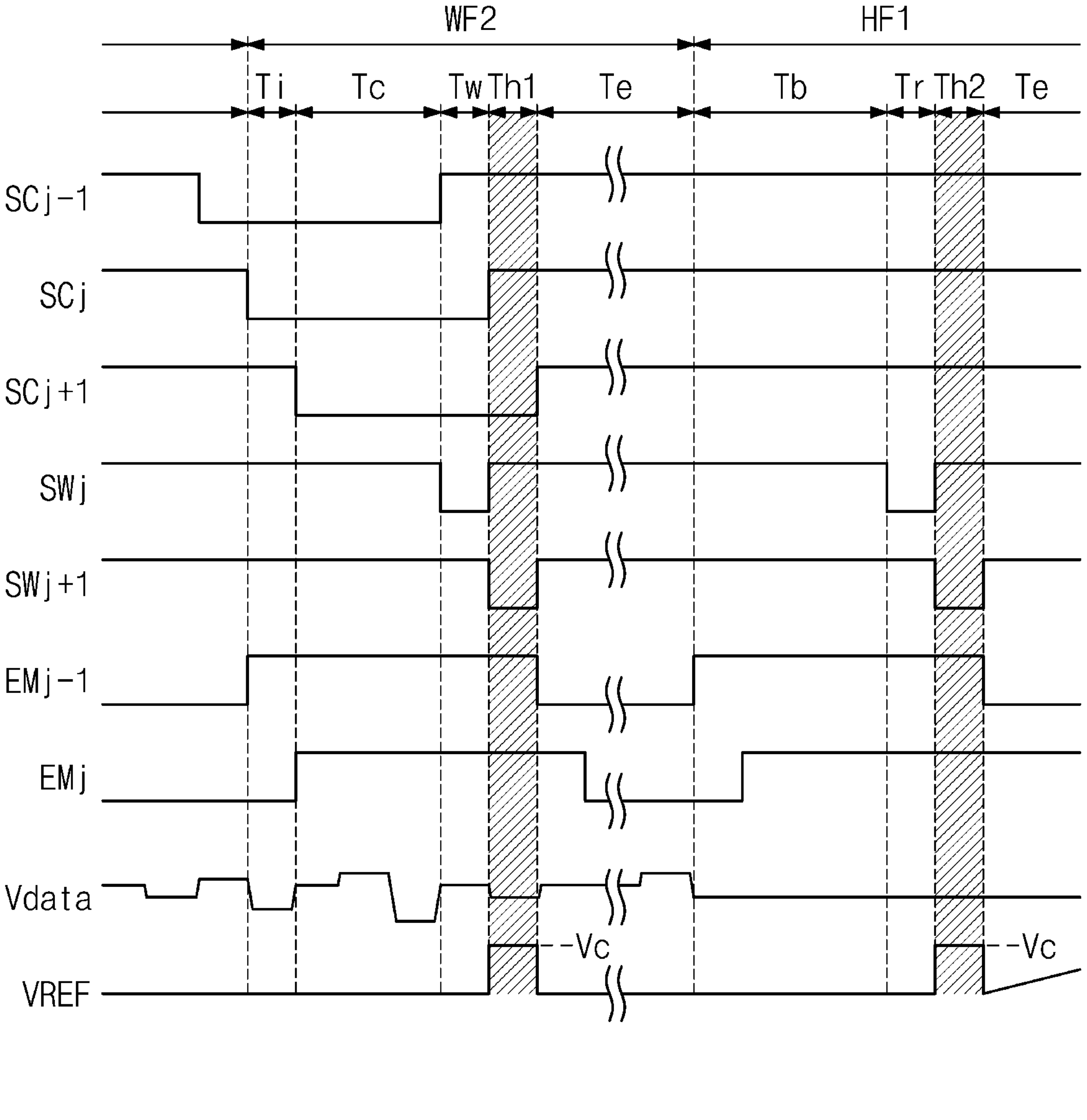

FIG. 10A is a circuit diagram of a pixel, according to another embodiment of the present disclosure. FIGS. 10B and 10C are diagrams for describing an operation of a pixel during a sixth period, according to an embodiment of the present disclosure.

Referring to FIG. 10A, a pixel PXij-a according to another embodiment includes a pixel circuit unit PXCa and the light emitting element ED. In an embodiment of the present disclosure, the pixel circuit unit PXCa may include nine transistors and two capacitors. Hereinafter, the nine transistors are referred to as "first to ninth transistors T1, T2, T3, T4, T5, T6, T7, T8, and T9", respectively. The two capacitors are referred to as "first and second capacitors C1 and C2", respectively.

In an embodiment, each of the first to ninth transistors T1 to T9 is a P-type transistor having a low-temperature polycrystalline silicon (LTPS) semiconductor layer. Alternatively, each of the first to ninth transistors T1 to T9 may be an N-type transistor. Moreover, at least one of the first to ninth transistors T1 to T9 may be an N-type transistor and the others thereof may be P-type transistors. Alternatively, at least one of the first to ninth transistors T1 to T9 may be a transistor having an oxide semiconductor layer. In an embodiment, for example, some of the first to ninth transistors T1 to T9 may be oxide semiconductor transistors, and others thereof may be LTPS transistors.

In the pixel PXij-a according to an embodiment of the present disclosure, the circuit configuration of the pixel PXij-a composed of the first to eighth transistors T1 to T8 and the first and second capacitors C1 and C2 except for the ninth transistor T9 may be the same as the circuit configuration shown in FIG. 2. Accordingly, the connection structure and operation of the ninth transistor T9 will be described in detail in FIGS. 10A to 10C.

The ninth transistor T9 (or a "shift compensation transistor") is connected between the second node NB and the reference voltage line VL3 and receives a shift scan signal. The ninth transistor T9 includes a first electrode connected to the second node NB, a second electrode connected to the reference voltage line VL3, and a gate electrode for receiving the shift scan signal. The ninth transistor T9 may be connected to a (j+1)-th write scan line SWLj+1 to receive a (j+1)-th write scan signal SWj+1 as the "shift scan signal". The ninth transistor T9 electrically connects the second node NB and the reference voltage line VL3 in response to the shift scan signal.

Referring to FIGS. 10B and 10C, the sixth period may include a sixth-first period Th1 located in the second write frame WF2 and a sixth-second period Th2 located in the holding frames HF1, HF2, and HF3. The sixth-first period Th1 is located between the third period Tw and the fourth period Te. The sixth-second period Th2 is located between the fifth period Tr and the fourth period Te. The third period Tw may precede the sixth-first period Th1, and the fifth period Tr may precede the sixth-second period Th2. The sixth-first period Th1 and the sixth-second period Th2 may overlap the deactivation period of each of the first and second emission control signals EMj−1 and EMj.

During the sixth-first period Th1 of the second write frame WF2, each of the (j+1)-th compensation scan signal SCj+1 (i.e., the second scan signal) and the (j+1)-th write scan signal SWj+1 (i.e., the shift scan signal) has an activation level. That is, the sixth-first period Th1 may be an activation period of each of the (j+1)-th compensation scan signal SCj+1 (i.e., the second scan signal) and the (j+1)-th write scan signal SWj+1. Accordingly, during the sixth-first period Th1, the third transistor T3 is turned on in response to the (j+1)-th compensation scan signal SCj+1, and the ninth transistor T9 is turned on in response to the (j+1)-th write scan signal SWj+1.

During the sixth-second period Th2 of the holding frames HF1, HF2, and HF3, the (j+1)-th write scan signal SWj+1 (i.e., the shift scan signal) has the activation level. That is, the sixth-second period Th2 may be an activation period of the (j+1)-th write scan signal SWj+1. Accordingly, during the sixth-second period Th2, the ninth transistor T9 is turned on in response to the (j+1)-th write scan signal SWj+1.

The reference voltage VREF is applied to the second node NB through the turned-on ninth transistor T9 and applied to the third node NC through the turned-on third transistor T3. Accordingly, during the sixth-first period Th1 and the sixth-second period Th2, the second and third nodes NB and NC may be compensated for with the reference voltage VREF.

As an example of the present disclosure, during the sixth-first period Th1 and the sixth-second period Th2, the reference voltage VREF may have a voltage level higher than or equal to a voltage level of a target compensation voltage Vc. As an example of the present disclosure, the target compensation voltage Vc may have a higher voltage level than a voltage level of the first driving voltage ELVDD. In addition, after the sixth-second period Th2 of each of the holding frames HF1, HF2, and HF3, the reference voltage may be gradually changed to a level higher than the base level Vrb.

During the sixth-first period Th1 and the sixth-second period Th2, a negative bias may be applied to the first transistor T1 by the reference voltage VREF having a higher voltage level than the voltage level of the first driving voltage ELVDD. Due to the negative bias of the first transistor T1, the threshold voltage Vth of the first transistor T1 may be shifted in advance before an emission period (i.e., the fourth period Te).

The fourth period Te may start after the sixth-first period Th1 and the sixth-second period Th2 in each frame. As the threshold voltage Vth is shifted in advance during the sixth-first period Th1 and the sixth-second period Th2 before the fourth period Te (i.e., the emission period) starts, a shift level (i.e., a shift amount) of the threshold voltage Vth may decrease during the fourth period Te. As a result, the amount of change in the emission current Ied (see FIG. 7A) caused by the shift amount of the threshold voltage Vth may be effectively reduced.

According to an embodiment of the present disclosure, it is possible to secure a sufficient compensation period to compensate for a threshold voltage deviation or a change in a threshold voltage of a first transistor even in a high-speed operation, thereby minimizing a current deviation provided to a light emitting element when a low-grayscale image is displayed at a high operating frequency. Moreover, when a high-grayscale image is displayed, a current deviation occurring at less than a threshold voltage is compensated for through a sink current, thereby preventing a luminance deviation from occurring due to the current deviation.

Furthermore, it is possible to reduce a change in an emission current during an emission period by shifting a threshold voltage of a first transistor in advance before the emission period. As a result, a flicker phenomenon may be effectively prevented or reduced.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display panel including a pixel,
wherein the pixel includes:
a light emitting element;
a first capacitor between a first node and a voltage line;
a first transistor connected to the first node, the voltage line, and a second node;
a second transistor connected between the first node and a third node and configured to receive a first scan signal;
a third transistor connected between the second node and the third node and configured to receive a second scan signal;
a second capacitor connected between the third node and a fourth node;
a fourth transistor connected between the fourth node and a data line and configured to receive a third scan signal; and
a fifth transistor connected between the second node and the light emitting element and configured to receive a first emission control signal,
wherein during a first period, the first scan signal has an activation level, and each of the second scan signal, the third scan signal, and the first emission control signal has a deactivation level.

2. The display device of claim 1, wherein the pixel further includes:
a sixth transistor connected between the third node and a reference voltage line and configured to receive a second emission control signal;
a seventh transistor connected between the fourth node and the reference voltage line and configured to receive a fourth scan signal; and
an eighth transistor connected between the light emitting element and the reference voltage line and configured to receive a fifth scan signal.

3. The display device of claim 2, wherein, during a first period, each of the fourth scan signal and the second emission control signal has the activation level, and the fifth scan signal has the deactivation level.

4. The display device of claim 3, wherein, during the first period, the first node, the third node, and the fourth node are initialized to a reference voltage applied through the reference voltage line.

5. The display device of claim 4, wherein a second period follows the first period,
wherein, during the second period, each of the first scan signal, the second scan signal, and the fourth scan signal has the activation level, and each of the third scan signal and the fifth scan signal has the deactivation level, and
wherein, during the second period, each of the first emission control signal and the second emission control signal has the deactivation level.

6. The display device of claim 5, wherein, during the second period, a driving voltage applied to the voltage line is applied to the first node via the turned-on first, second, and third transistors, and the fourth node remains at the reference voltage.

7. The display device of claim 5, wherein a third period follows the second period,
wherein, during the third period, each of the first scan signal, the second scan signal, the third scan signal, and the fifth scan signal has the activation level, and
wherein, during the third period, each of the fourth scan signal, the first emission control signal, and the second emission control signal has the deactivation level.

8. The display device of claim 7, wherein a duration of the first period is the same as a duration of the third period, and
wherein a duration of the second period is greater than the duration of each of the first period and the third period.

9. The display device of claim 7, wherein a fourth period follows the third period,
wherein, during the fourth period, the first emission control signal has the activation level, and
wherein, during the fourth period, each of the first scan signal, the third scan signal, the fourth scan signal, and the fifth scan signal has the deactivation level.

10. The display device of claim 2, wherein the display panel displays an image during a plurality of frames, and at least one frame among the plurality of frames includes a write frame and at least one holding frame,
wherein each of the first scan signal, the second scan signal, and the fourth scan signal has an activation period having an activation level within the write frame and is maintained in an inactive state during the holding frame, and wherein each of the third scan signal and the fifth scan signal includes an activation period having the activation level within each of the write frame and the holding frame.

11. The display device of claim 10, wherein each of the first emission control signal and the second emission control signal includes a deactivation period having a deactivation level within each of the write frame and the holding frame, and wherein the activation period of each of the third scan signal and the fifth scan signal overlaps the deactivation period of each of the first emission control signal and the second emission control signal.

12. The display device of claim 10, wherein a reference voltage applied through the reference voltage line has a base level during the write frame and is changed to a level higher than the base level within the holding frame.

13. The display device of claim 12, wherein the holding frame includes a period in which the reference voltage gradually rises from the base level to a level higher than a predetermined reference level and then falls, and the predetermined reference level is higher than the base level.

14. The display device of claim 2, wherein the pixel further includes:

a ninth transistor connected between the second node and the reference voltage line and configured to receive a shift scan signal.

15. The display device of claim 14, wherein the display panel displays an image during a plurality of frames, and at least one frame among the plurality of frames includes a write frame and at least one holding frame, wherein each of the first scan signal, the second scan signal, and the fourth scan signal has an activation period having an activation level within the write frame and is maintained in an inactive state during the holding frame, and wherein each of the third scan signal and the fifth scan signal includes a first activation period having the activation level within each of the write frame and the holding frame, and wherein the shift scan signal includes a second activation period having the activation level within each of the write frame and the holding frame.

16. The display device of claim 15, wherein the first activation period precedes the second activation period.

17. The display device of claim 15, wherein each of the first emission control signal and the second emission control signal includes a deactivation period having a deactivation level within each of the write frame and the holding frame, and wherein the first activation period and the second activation period overlap the deactivation period of each of the first emission control signal and the second emission control signal.

18. The display device of claim 15, wherein a reference voltage applied through the reference voltage line has a higher voltage level than a voltage level of a driving voltage applied to the voltage line during the second activation period.

19. The display device of claim 18, wherein the reference voltage has a base level during the write frame, and is changed to a level higher than the base level after the second activation period during the holding frame.

20. An electronic device comprising:

a display panel including a pixel, wherein the pixel includes:

a light emitting element;

a first capacitor between a first node and a voltage line;

a first transistor connected to the first node, the voltage line, and a second node;

a second transistor connected between the first node and a third node and configured to receive a first scan signal;

a third transistor connected between the second node and the third node and configured to receive a second scan signal;

a second capacitor connected between the third node and a fourth node;

a fourth transistor connected between the fourth node and a data line and configured to receive a third scan signal; and a shift compensation transistor connected between the second node and a reference voltage line and configured to receive a shift scan signal, wherein the shift scan signal includes an activation period having an activation level, and wherein a reference voltage applied through the reference voltage line has a higher voltage level than a voltage level of a driving voltage applied to the voltage line during the activation period.

21. The electronic device of claim 20, wherein the display panel displays an image during a plurality of frames, and at least one frame among the plurality of frames includes a write frame and at least one holding frame, wherein each of the first scan signal and the second scan signal has an activation period having an activation level within the write frame and remains inactive during the holding frame, wherein the third scan signal includes a first activation period having the activation level within each of the write frame and the holding frame, and wherein the shift scan signal includes a second activation period having the activation level within each of the write frame and the holding frame.

22. The electronic device of claim 21, wherein the first activation period precedes the second activation period.

23. The electronic device of claim 21, wherein a reference voltage applied through the reference voltage line has a higher voltage level than a voltage level of a driving voltage applied to the voltage line during the second activation period.

24. The electronic device of claim 23, wherein the reference voltage has a base level during the write frame, and is changed to a level higher than the base level after the second activation period during the holding frame.

* * * * *